US008982817B2

(12) United States Patent
Miki et al.

(10) Patent No.: US 8,982,817 B2
(45) Date of Patent: Mar. 17, 2015

(54) RADIO COMMUNICATION SYSTEM, BASE STATION APPARATUS AND USER TERMINAL

(75) Inventors: Nobuhiko Miki, Tokyo (JP); Anil Umesh, Tokyo (JP); Naoto Okubo, Tokyo (JP)

(73) Assignee: NTT DOCOMO, Inc., Tokyo (JP)

( * ) Notice: Subject to any disclaimer, the term of this patent is extended or adjusted under 35 U.S.C. 154(b) by 237 days.

(21) Appl. No.: 13/578,071

(22) PCT Filed: Feb. 15, 2011

(86) PCT No.: PCT/JP2011/053078
§ 371 (c)(1),
(2), (4) Date: Oct. 25, 2012

(87) PCT Pub. No.: WO2011/099612
PCT Pub. Date: Aug. 18, 2011

(65) Prior Publication Data
US 2013/0039302 A1    Feb. 14, 2013

(30) Foreign Application Priority Data

Feb. 15, 2010   (JP) ................................. 2010-030629

(51) Int. Cl.
*H04W 4/00*     (2009.01)
*H04L 5/00*     (2006.01)
*H04W 28/04*    (2009.01)

(52) U.S. Cl.
CPC .............. *H04L 5/001* (2013.01); *H04W 28/04* (2013.01); *H04L 5/0037* (2013.01)
USPC ........................................................ 370/329

(58) Field of Classification Search
USPC ................................................ 370/329, 330
See application file for complete search history.

(56) References Cited

U.S. PATENT DOCUMENTS

2009/0088148 A1 *   4/2009   Chung et al. .................. 455/423
2012/0076088 A1 *   3/2012   Hwang et al. ................. 370/329
(Continued)

FOREIGN PATENT DOCUMENTS

WO    WO2012/041897 A2 *   4/2012   ............ H04W 72/12

OTHER PUBLICATIONS

U.S. Appl. No. 61/242,806, Chung et al, Cross Carrier Scheduling and Carrier Indication Methods for Carrier Aggregation, filed Sep. 16, 2009 (which is translated to English Jan. 4, 2012), pp. 1-23.*

(Continued)

*Primary Examiner* — Phuongchau Ba Nguyen
(74) *Attorney, Agent, or Firm* — Osha Liang LLP

(57) ABSTRACT

The present invention maintains communication even during a transition period in which ON/OFF of the CIF is switched by higher layer signaling or during a transition period in which the number of component carrier aggregations is increased/decreased. In a radio communication system in which an LTE-A system, in which an LTE-A system to add or remove the frequency band to assign for communication between a base station apparatus (20) and a mobile terminal apparatus (10) on a per component carrier basis, and an LTE system to perform communication between the base station apparatus (20) and the mobile terminal apparatus (10) using one fixed fundamental frequency block, are arranged in an overlapping manner, in the LTE-A system, one of the fundamental frequency blocks assigned to the mobile terminal apparatus (10) is determined as an anchor block, and the anchor block supports the same operation as in the LTE system.

6 Claims, 17 Drawing Sheets

(56) References Cited

U.S. PATENT DOCUMENTS

| | | | |
|---|---|---|---|
| 2012/0113941 A1* | 5/2012 | Chung et al. .................. | 370/329 |
| 2013/0010709 A1* | 1/2013 | Earnshaw et al. ............. | 370/329 |
| 2013/0021948 A1* | 1/2013 | Moulsley ...................... | 370/254 |
| 2013/0039302 A1* | 2/2013 | Miki et al. ..................... | 370/329 |
| 2013/0051214 A1* | 2/2013 | Fong et al. .................... | 370/216 |

OTHER PUBLICATIONS

U.S. Appl. No. 61/246,052, Mo-Han Fong, et al., filed Sep. 25, 2009, pp. 1-71 (Abstract—1 page, Claims—4 pages, Drawings 8 pages, Specification—58 pages).*

Office Action for Japanese Patent Application No. 2010-030629 dated Apr. 24, 2012, with English translation thereof (5 pages).

3GPP TSG RAN WG1 #55bis, R1-090356, "Notion of Anchor Carrier in LTE-A," Qualcomm Europe, Ljubljana, Slovenia, Jan. 12-16, 2009 (5 pages).

International Search Report w/translation from PCT/JP2011/053078 dated Mar. 22, 2011 (3 pages).

3GPP TSG RAN WG1 #55bis, R1-080356; "Notion of Anchor Carrier in LTE-A"; Qualcomm Europe, Ljubljana, Slovenia; Jan. 12-16, 2009 (5 pages).

3GPP TSG-RAN WG1 Meeting #59bis, R1-100361; "Further discussion on PDCCH with cross carrier operation"; Panasonic, Valencia, Spain; Jan. 18-22, 2010 (6 pages).

TSG-RAN WG2 #61, R2-080762; "Synchronized RRC re-configuration"; Ericsson, Sorrento, Italy, Feb. 11-15, 2008 (5 pages).

\* cited by examiner

◂----▸ CELL-SPECIFIC DL/UL PAIR
◂——▸ UE-SPECIFIC DL/UL PAIR

RADIO COMMUNICATION SYSTEM, BASE STATION APPARATUS AND USER TERMINAL

TECHNICAL FIELD

The present invention relates to a radio communication system that transmits signals using one or a plurality of component carriers selected, in a system band that is divided into a plurality of fundamental frequency blocks (hereinafter referred to as "component carriers"). More particularly, the present invention relates to a base station apparatus that generates downlink signals and a user terminal that receives downlink signals from a base station apparatus.

BACKGROUND ART

The communication scheme to be a successor of W-CDMA (Wideband Code Division Multiple Access) and HSDPA (High Speed Downlink Packet Access), that is, long-term evolution (LTE), has been set forth by 3GPP, which is the standards organization of W-CDMA, and, for radio access schemes, OFDMA (Orthogonal Frequency Division Multiple Access) has been employed on the downlink and SC-FDMA (Single-Carrier Frequency Division Multiple Access) has been employed on the uplink. Presently, 3GPP is studying the successor system of LTE (LTE-Advanced (LTE-A) or Release 10).

The LTE system is a system to perform communication by sharing one, two, or a greater number of physical channels by a plurality of mobile stations UEs, on both the uplink and the downlink. A channel that is shared by a plurality of mobile stations UEs is generally referred to as a shared channel, and, in LTE, is a PUSCH (Physical Uplink Shared Channel) on the uplink or a PDSCH (Physical Downlink Shared Channel) on the downlink.

In a communication system using shared channels such as described above, to which mobile stations UEs the above shared channels are assigned needs to be signaled, per subframe, which is the transmission time unit. A subframe may be referred to as a transmission time interval (TTI).

In LTE, a PDCCH (Physical Downlink Control Channel) is defined as a downlink control channel to be used for the above signaling, and, furthermore, a PCFICH (Physical Control Format Indicator Channel) is defined as a control channel to report the number of OFDM symbols to be used for the PDCCH, and a PHICH (Physical Hybrid-ARQ Indicator Channel) is defined as a control channel to transmit ACK or NACK information for hybrid ARQ for the PUSCH.

The downlink control information that is transmitted by the PDCCH includes, for example, downlink scheduling information, UL scheduling grant, overload indicator, transmission power control command bit, and so on. Also, the downlink scheduling information includes, for example, downlink resource block assignment information, UE IDs, the number of streams, information related to precoding vectors, data size, modulation scheme, and information related to HARQ (Hybrid Automatic Repeat reQuest). Also, the above uplink scheduling grant includes, for example, uplink resource block assignment information, UE IDs, data size, modulation scheme, uplink transmission power information, and demodulation reference signal information.

The above PCFICH is information to report the PDCCH format. To be more specific, by means of this PCFICH, the number of OFDM symbols, to which the PDCCH is mapped, is reported as control channel format information (CFI: Control channel Format Indicator). In LTE, the number of OFDM symbols, to which the PDCCH is mapped, is one of 1, 2 and 3, and, in one subframe, the PDCCH is mapped from the top OFDM symbol.

On the downlink, a range to match the number of OFDM symbols (CFI value) reported by the PCFICH, from the top of the subframe, is the control channel region that is assigned to the PDCCH. The mobile station decodes the control channel region, and furthermore, if there is information for that mobile station, specifies and decodes the radio resource allocated to the PDSCH, based on the downlink control information.

On the other hand, in LTE-A, which is presently under study by 3GPP, there is an agreement to widen the band by gathering and grouping a plurality of component carriers. There might be a communication environment where some component carriers are subject to severe interference from other cells while other component carriers are not influenced much from interference. Then, a mechanism for assigning downlink control information (DCI), which relates to the shared data channels (PDSCH/PUSCH) transmitted by component carriers that are subject to severe interference from other cells, from other component carriers that are influenced less by interference, is under study. At the present stage, there is an agreement to add a bit field (CIF: Carrier Indicator Field) for setting a carrier indicator in downlink control information (DCI), reporting the presence/absence of the CIF from the base station apparatus (e-Node B), by RRC signaling, per mobile station (UE: User Equipment), and making the CIF three bits.

CITATION LIST

Non-Patent Literature

Non-Patent Literature 1: 3GPP, R1-100361, Panasonic, "Further discussion on PDCCH with cross carrier operation"

Non-Patent Literature 2: 3GPP, R2-080762, Ericsson, "Synchronized RRC re-configuration"

SUMMARY OF THE INVENTION

Technical Problem

However, in the event the presence/absence of the CIF is reported from the base station apparatus to the mobile station by RRC signaling, during the interval (for example, maximum 15 ms) which lasts after the base station apparatus transmits RRC signaling (RRC reconfiguration) until the base station apparatus receives a complete message, the base station apparatus is not certain which state the mobile station is in (that is, whether the mobile station has received or has not received RRC signaling).

For example, in a case of requesting switching the DCI configuration from a configuration in which a CIF is not added (CIF "OFF") to a configuration in which a CIF is added (CIF "ON"), there is a possibility that the following defects occur. In the event the mobile station fails to receive RRC signaling (RRC reconfiguration) requesting switch from CIF "OFF" to CIF "ON" and requests retransmission, a DCI configuration in which a CIF is added is transmitted. In this case, although the mobile station tries to perform blind decoding based on the number of bits of CIF "OFF" prior to the switching, the mobile station fails blind decoding because the number of bits in the DCI configuration of CIF "ON" is different. As a result of this, there is a problem that the PDSCH cannot be demodulated. There is also a possibility that the same problem occurs when switch from CIF "ON" to CIF "OFF" is requested.

Also, in the transition period in which the number of component carrier aggregations switches, the same problem might occur. The base station apparatus reports addition/removal of component carriers to the mobile station by RRC signaling. Here, during the interval which lasts after the base station apparatus transmits RRC signaling (RRC reconfiguration) until the base station apparatus receives a complete message, the base station apparatus is not certain which state the mobile station is in (that is, whether the mobile station has received or has not received RRC signaling). In the event component carriers are added or removed, although the content of a table, showing which component carrier indices the three-bit CIF values indicate, is reported by RRC signaling, if the number of component carrier aggregations changes, the content of the table may also change. In this case, the base station apparatus is not certain which table the mobile station references to specify the component carrier index, and therefore there is a possibility that the mobile station misidentifies component carriers.

The present invention is made in view of the above problems, and it is therefore an object of the present invention to provide a radio communication system, a base station apparatus and a user terminal that can maintain stable communication even during a transition period in which CIF ON/OFF is switched by higher layer signaling or during a transition period in which the number of component carrier aggregations is increased or decreased.

Solution to Problem

One aspect of the present invention provides a radio communication system in which a first communication system and a second communication system are arranged in an overlapping manner, the first communication system adding or removing a frequency band to assign for communication between a base station apparatus and a user terminal on a per fundamental frequency block basis, and the second communication system performing communication between the base station apparatus and the user terminal via one fixed fundamental frequency block, and, in this radio communication system, in the first communication system, one of fundamental frequency blocks assigned to the user terminal is determined as an anchor block, and the anchor block supports a same operation as in the second communication system.

According to the present invention, it is possible to maintain communication by the second communication system even during the transition period in which CIF ON/OFF is switched by higher layer signaling or during the transition period in which the number of component carrier aggregations is increased or decreased.

Another aspect of the present invention provides a radio communication system in which a first communication system and a second communication system are arranged in an overlapping manner, the first communication system adding or removing a frequency band to assign for communication between a base station apparatus and a user terminal on a per fundamental frequency block basis, and the second communication system performing communication between the base station apparatus and the user terminal via one fixed fundamental frequency block, and, in this radio communication system, in the first and second communication systems, a common search space that is common between user terminals and a user specific search space that is separate between user terminals are assigned to a downlink control channel region of the fundamental frequency block, and the base station apparatus maps user common control information, which a plurality of user terminals connecting to a same cell, need to receive, to the common search space, maps user-specific control information, which each user terminal needs to receive individually, to the user-specific search space, in a configuration according to the first communication system, and furthermore, maps the user-specific control information, which each user terminal needs to receive individually, to the common search space, fixedly to the configuration which guarantees the same operation as in the second communication system.

According to the present invention, it is possible to perform communication via a common search space in which user-specific control information, fixedly to the configuration which guarantees the same operation as in the second communication system, is mapped, even during the transition period in which CIF ON/OFF is switched by higher layer signaling or during the transition period in which the number of component carrier aggregations is increased or decreased.

Technical Advantages of the Invention

According to the present invention, it is possible to maintain stable communication even during the transition period in which CIF ON/OFF is switched by higher layer signaling or during the transition period in which the number of component carrier aggregations is increased or decreased.

DESCRIPTION OF EMBODIMENTS

Figure 1:
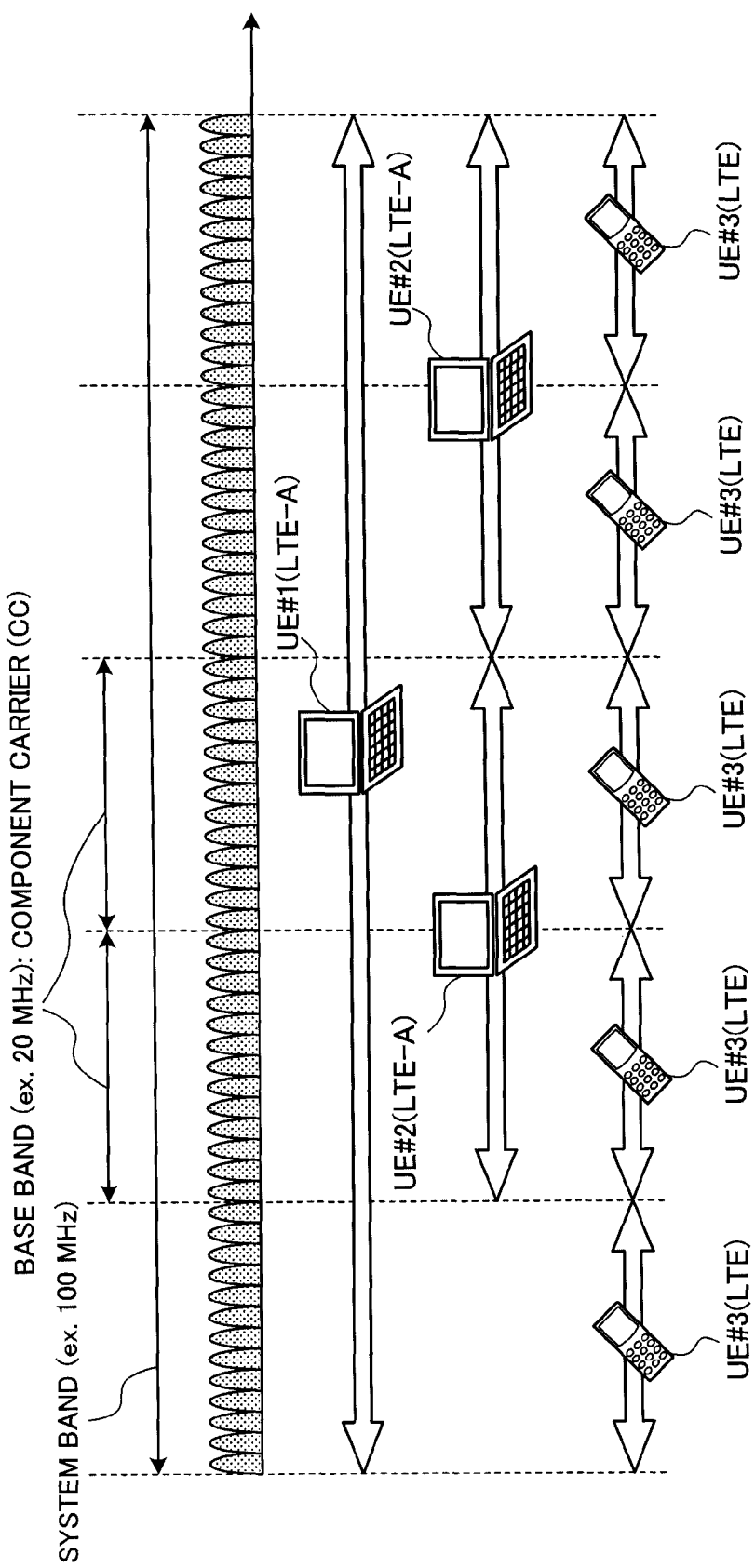
FIG. 1 is a diagram illustrating a layered bandwidth configuration defined in LTE-A.

FIG. 1 is a diagram showing a layered bandwidth configuration defined in LTE-A. The example of FIG. 1 illustrates a layered bandwidth configuration where an LTE-A system, which is the first mobile communication system having the first system band that is formed with a plurality of component carriers (CCs), and an LTE system, which is a second mobile communication system having a second system band that is formed with one component carrier, coexist. In the LTE-A system, for example, radio communication is performed in a variable system bandwidth of 100 MHz or below, and, in the LTE system, radio communication is performed in a variable system bandwidth of 20 MHz or below. The system band of the LTE-A system includes at least one component carrier, where the system band of the LTE system is one unit. Widening the band by way of gathering a plurality of component carriers in this way is referred to as "carrier aggregation."

For example, in FIG. 1, the system band of the LTE-A system is a system band to include bands of five component carriers (20 MHz×5=100 MHz), where the system band (base band: 20 MHz) of the LTE system is one component carrier. In FIG. 1, mobile terminal apparatus UE (User Equipment) #1 is a mobile terminal apparatus to support the LTE-A system (and also support the LTE system), and supports a system band up to 100 MHz. UE #2 is a mobile terminal apparatus to support the LTE-A system (and also support the LTE system), and supports a system band up to 40 MHz (20 MHz×2=40 MHz). UE #3 is a mobile terminal apparatus to support the LTE system (and not support the LTE-A system), and supports a system band up to 20 MHz (base band).

The present inventor has focused upon the fact that, in the LTE-A system, switching of CIF ON/OFF or the number of component carrier aggregations shows an uncertain state during the transition period in which CIF ON/OFF is switched or during the transition period in which the number of component carrier aggregations is increased/decreased, and has arrived at the present invention by contemplating a configuration whereby communication is possible even in a state where switching of CIF ON/OFF or the number of component carrier aggregations is uncertain.

One aspect of the present invention is defined such that, in the LTE-A system, one of the component carriers assigned to the user is selected as an anchor carrier, and the anchor carrier supports the same operation as in LTE (Release 8). To support the same operation as in LTE, in the anchor carrier, the base station apparatus signals a DCI of the same configuration as in LTE, to the mobile station, and the mobile station performs blind decoding of the DCI from the downlink control channel region of the anchor carrier.

By this means, even during a transition period in which CIF ON/OFF is switched or during a transition period in which the number of component carrier aggregations is increased/decreased, the same operations as in LTE are supported in communication involving an anchor carrier, so that it is possible to maintain communication.

Figure 7:
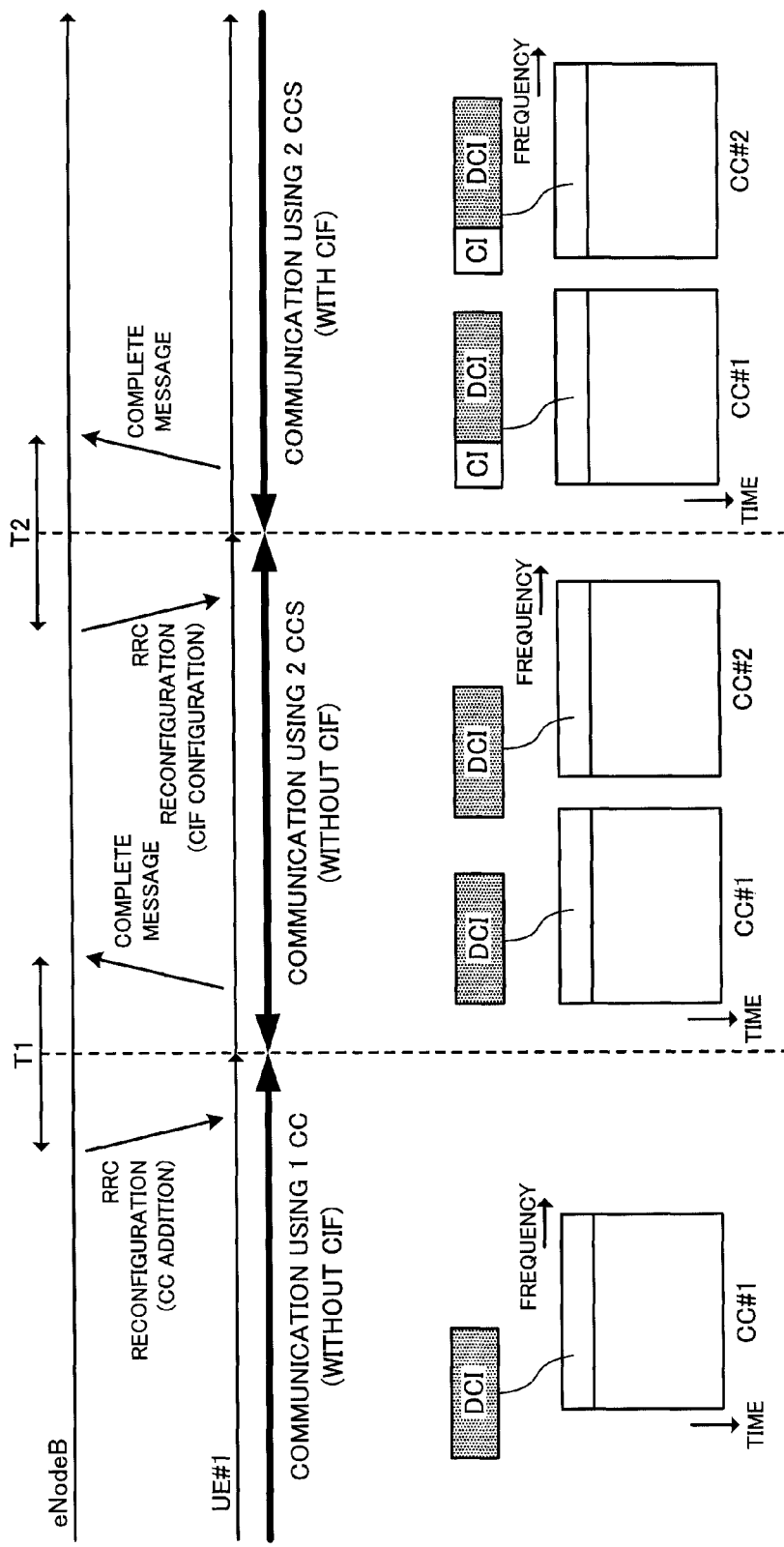
FIG. 7 is a sequence diagram in the event a component carrier is added and the CIF configuration is changed.

Now, communication involving an anchor carrier, which is defined to support the same operations as in LTE (Release 8), will be described in detail. FIG. 7 is a sequence diagram of reporting switch from CIF "OFF" to CIF "ON," with respect to the DCI configuration, and addition of a component carrier, by RRC signaling. e-Node B illustrated in FIG. 7 is a base station apparatus, and UE #1 is a mobile terminal apparatus that is communicating with the base station apparatus.

In the initial stage, only one component carrier CC #1 is assigned to UE #1, and communication is started between e-Node B and UE #1 via that component carrier CC #1 assigned. At this point in time, DCI configuration in which CIF is "OFF" is used.

In the event one more component carrier is assigned for communication with UE #1, e-Node B transmits RRC signaling (RRC reconfiguration: CC addition), which designates the component carrier number to add, to UE #1. Upon receiving the command (CC addition) given by RRC signaling, UE #1 makes preparations for supporting communication via two component carriers CC #1 and CC #2. When support for the two component carriers CC #1 and CC #2 is complete, UE #1 returns a complete message to e-Node B. During the interval T1, which lasts after e-Node B transmits RRC signaling (RRC reconfiguration) to UE #1 until e-Node B receives a complete message, e-Node B is not certain whether or not UE #1 is able to support communication involving the two component carriers CC #1 and CC #2.

The present invention selects one of the component carriers assigned to the user as an anchor carrier and defines the anchor carrier to support the same operation as in LTE, so that e-Node B and UE #1 both mutually recognize one of the component carriers assigned to UE #1, as an anchor carrier. In the event the number of component carriers to use in communication between e-Node B and UE #1 is increased, e-Node B communicates with UE #1 via an anchor carrier at least during interval T1. That is to say, during the interval T1, in which the number of component carriers is uncertain, communication by LTE is maintained, via an anchor carrier which supports LTE operations—or which, in other words, fixes a DCI configuration in which CIF is "OFF."

In the event the number of component carriers to use in communication between e-Node B and UE #1 is decreased, as in the case of increasing the number of component carriers, the interval which lasts after RRC signaling (RRC reconfiguration) is transmitted until a complete message is received, is a time period in which the number of component carriers is uncertain. So, in the event the number of component carriers is decreased after communication between e-Node B and UE #1 is started, it is possible to maintain communication by performing communication using an anchor carrier that supports LTE operations.

Figure 8:
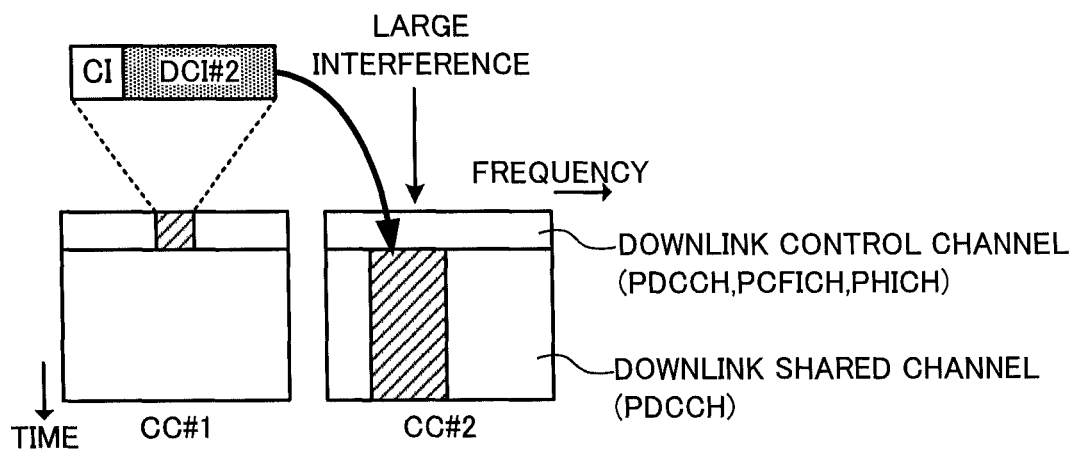
FIG. 8 is a schematic diagram of multiplexing a DCI for a downlink shared channel of a component carrier subject to severe interference, upon another component carrier.

Also, in the event the band is widened by increasing the number of component carriers (that is, the number of carrier aggregations) to use in communication between e-Node B and UE #1, as illustrated in FIG. 8, it is possible to multiplex downlink control information (DCI #2) for a downlink shared channel, which is to be transmitted by component carrier CC #2, subject to severe interference, over a downlink control channel of another component carrier CC #1, which is subject to little interference.

Here, a DCI configuration in which a carrier indicator (CI) is added to identify which component carrier (CC #1 or CC #2) the downlink control information (DCI #2) relates to. The field to represent the carrier indicator (CI) is the CIF. That is to say, in the event a DCI for shared data channel demodulation, which is multiplexed over the data region of a certain component carrier, is multiplexed over the control channel region of another component carrier, a CIF to represent the number (CC index) of the component carrier on which the shared data channel to be demodulated is multiplexed, is added to the DCI configuration (CIF "ON"). In the following descriptions, a DCI configuration, to which a CIF is added, may be referred to as a CIF configuration.

To switch a DCI configuration to a CIF configuration, e-Node B transmits RRC signaling (RRC reconfiguration: CIF configuration) to request CIF "ON," to UE #1. In response to the RRC signaling (RRC reconfiguration), UE #1 switches the DCI configuration upon blind decoding to a CIF configuration. When support for a CIF configuration is complete, UE #1 returns a complete message to e-Node B. During the interval T2 which lasts after e-Node B transmits RRC signaling (RRC reconfiguration) to UE #1 until e-Node B receives a complete message, e-Node B is uncertain whether or not UE #1 is capable of supporting the CIF configuration.

As described above, the present invention is defined such that one of the component carriers assigned to the user is selected as an anchor carrier and the anchor carrier guarantees LTE operations, e-Node B and UE #1 both recognize the anchor carrier. At least during the interval T2, e-Node B multiplexes a DCI having a DCI configuration in which a CIF is not added, upon a control channel, on a control channel in anchor carrier that guarantees LTE operations. Even if UE #1 receives a control channel having a CIF configuration before switching a DCI configuration to a CIF configuration, UE #1 fails blind decoding, because the number of DCI bits is different. However, with the present invention, a DCI to be received in an anchor carrier is defined to adopt LTE specifications (CIF "OFF"), so that UE #1 is able to perform blind decoding of the DCI from the control channel to be received in the anchor carrier.

Also, when switching the DCI configuration from a CIF configuration to the DCI configuration of the LTE specifications, although an uncertain time period is produced as when switching to a CIF configuration, UE #1 is able to decode the DCI correctly from the control channel received by the anchor carrier, by communicating via an anchor carrier that supports LTE operations.

Note that the anchor carrier may be maintained as a component carrier to support LTE operations even in periods other than the uncertain intervals T1 and T2. Also, the anchor carrier may be determined when communication is started between e-Node B and UE #1 and fixed until communication is finished, or may be changed dynamically, after communication is started, depending on the communication environment.

Figure 9A:
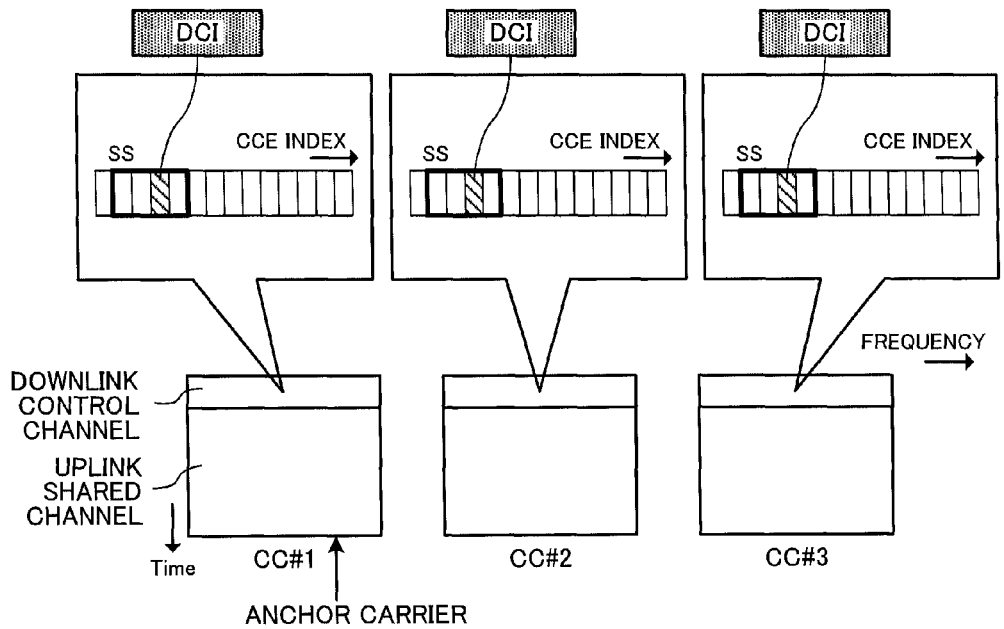
FIG. 9A is a schematic diagram of three component carriers assigned for communication between e-Node B and UE #1 in the event the CIF is "OFF.

FIG. 9A is a schematic diagram of three component carriers CC #1, CC #2 and CC #3, assigned for communication between e-Node B and UE #1, when the CIF is "OFF." On the downlink, in the component carriers, a control channel region (PDCCH and/or the like) is placed in the first through third OFDM symbols, from the top of one subframe, and, following the downlink control channel region (PDCCH), a downlink shared channel region (PDSCH and/or the like) is placed. A search space (SS) is set in the control channel region, and a DCI is multiplexed over the search space. In component carriers CC #1, CC #2 and CC #3, the DCI that is mapped in the search space (SS) in the control channel region is control information for a downlink shared channel mapped in the downlink shared channel region of the same component carrier. In FIG. 9A, one anchor carrier (for example, CC #1) is selected from three component carriers CC #1, CC #2 and CC #3, and this one anchor carrier CC #1 supports the same operations as in LTE. To be more specific, the search space (SS) in the control channel region of anchor carrier CC #1 is defined the same way as in LTE, and the DCI configuration to be multiplexed upon the search space has the same field configuration as defined in LTE. Consequently, even during the transition period in which the number of component carriers is increased or reduced, anchor carrier CC #1 alone supports the same operation as in LTE.

Figure 9B:
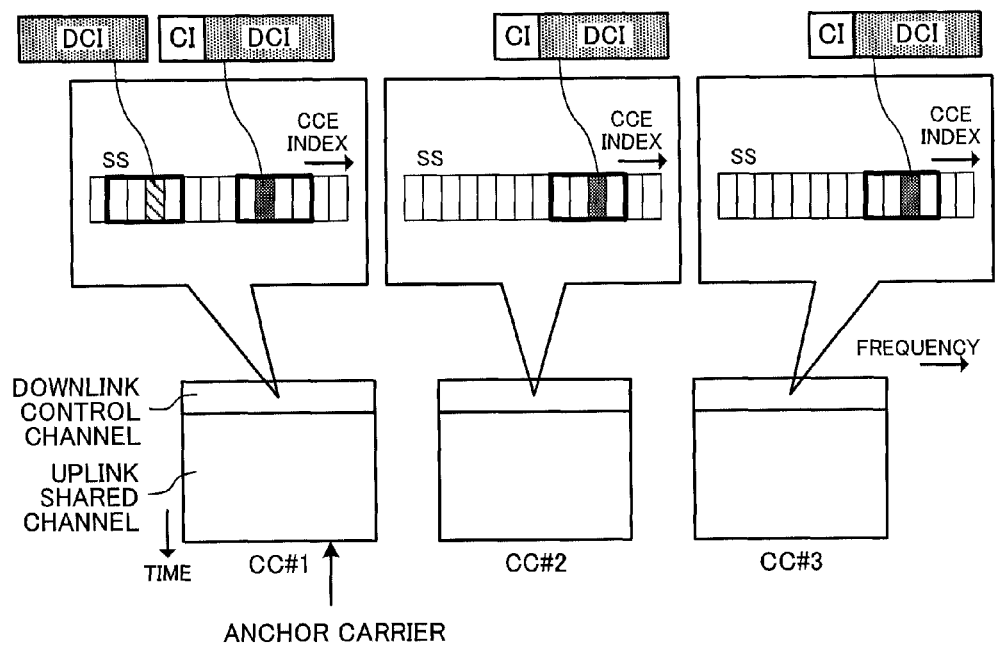
" and FIG. 9B is a schematic diagram of three component carriers assigned for communication between e-Node B and UE #1 in the event the CIF is "ON"

FIG. 9B is a schematic diagram of three component carriers CC #1, CC #2 and CC #3 assigned for communication between e-Node B and UE #1 when the CIF is "ON." In FIG. 9B, one component carrier CC #1 is selected as an anchor carrier from three component carriers CC #1, CC #2 and CC #3. In the event the CIF is "ON," a CIF configuration, in which a CIF is added to the DCI that is multiplexed on the control channel region of component carriers CC #1, CC #2 and CC #3, is used. In anchor carrier CC #1, to support the same operation as in LTE, a DCI having the field configuration defined in LTE is multiplexed over the search space (SS) defined in the same way as in LTE in the control channel region. Consequently, the mobile station is able to demodulate the DCI by performing blind decoding in the same way as in LTE, in the control channel region of anchor carrier CC #1. In the example illustrated in FIG. 9B, a DCI configuration which has the same field configuration as in LTE, and a DCI configuration in which a CIF is added, exist together, in the control channel region of anchor carrier CC #1.

Now, RAN1 #59 (3GPP TSG RAN WG1 Meeting) agrees on linking a downlink carrier and an uplink carrier, when a plurality of component carriers are subject to carrier aggregation. First, for communication with the user terminal, a pair of a cell-specific uplink and downlink is assigned to the same component carrier (DL/UL #0), and a pair of a user-specific uplink and downlink is established upon this component carrier. After that, when another component carrier #1 is assigned to the user-specific downlink, component carrier #1 is added to the user-specific downlink. Then, if there is no limit to addition/removal of component carriers, the cell-specific and user-specific links to old component carrier #0 are cancelled.

Figure 16A:
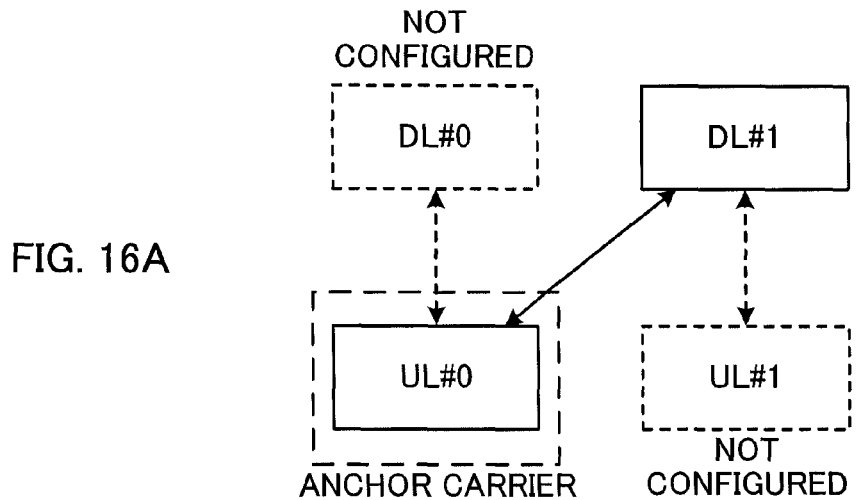
FIG. 16 is a diagram illustrating an example of a configuration of a downlink anchor carrier.
Figure 16B:
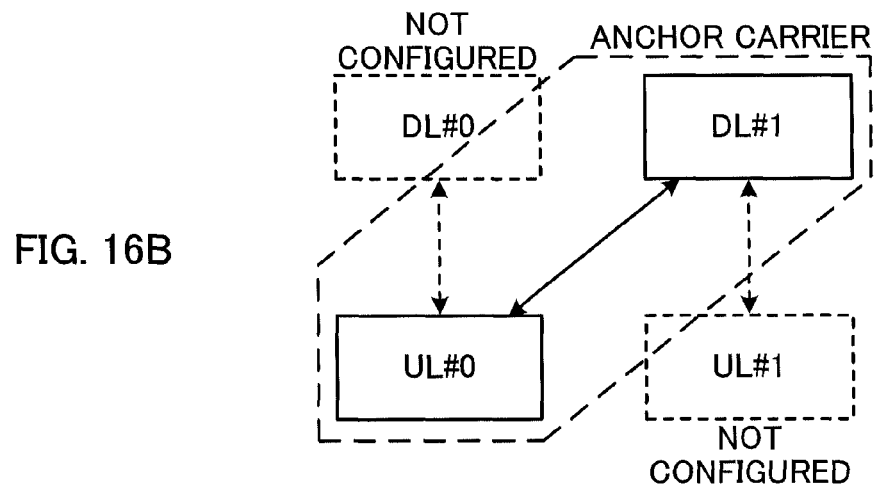
Figure 16C:
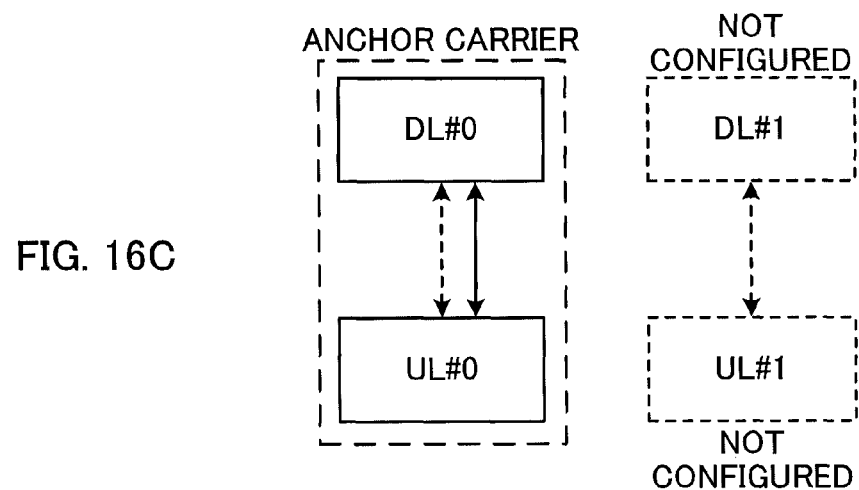

As described above, in a system configuration in which component carriers can be assigned to a downlink and an uplink separately, one of the downlink component carriers is selected as an anchor carrier. For the selection of the downlink anchor carrier, the three methods illustrated in FIGS. 16A, 16B and 16C are possible. Note that, in these drawings, the dotted lines represent a cell-specific uplink-downlink pair, and solid line represents user-specific uplink-downlink pairs.

The first method does not select an anchor carrier from downlink component carriers (FIG. 16A). The second method does not select a component carrier that constitutes a cell-specific uplink-downlink pair as a downlink anchor carrier (FIG. 16B). The third method selects a component carrier that constitutes a cell-specific uplink-downlink pair as a downlink anchor carrier (FIG. 16C).

(Contention RACH)

Figure 17:
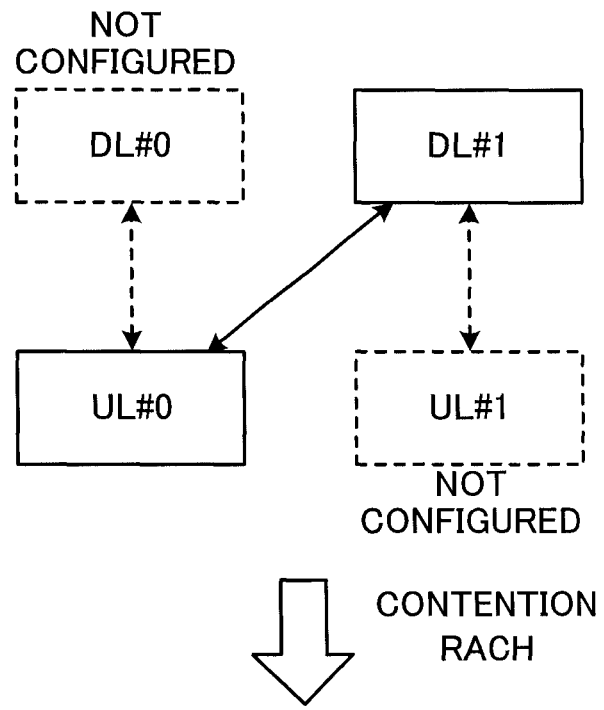
FIG. 17 is a diagram illustrating a contention RACH not having a cell-specific UL/DL pair.
Figure 17:
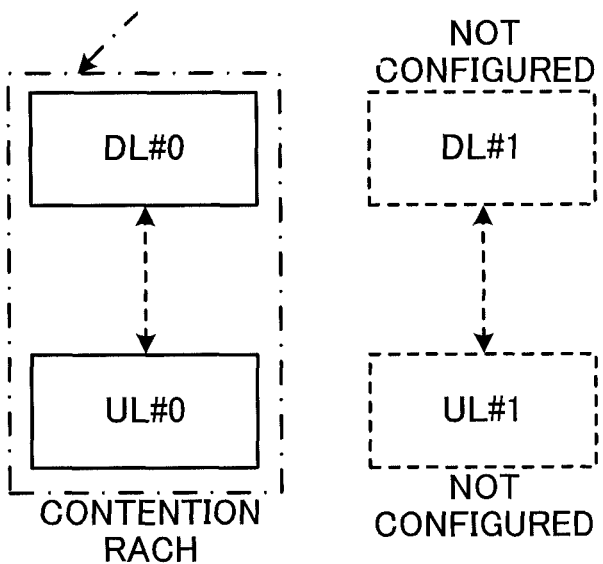

For an uplink-downlink anchor carrier pair, the third method illustrated in FIG. 16C is used. On the other hand, in the first method illustrated in FIG. 16A and second method illustrated in FIG. 16B, a cell-specific uplink-downlink pair is not formed. Consequently, it is preferable to use one cell-specific uplink-downlink pair for a contention RACH. Consequently, in the first and second methods, prior to the RACH step, the UE needs to acquire system information (SI) for a downlink carrier that links with an uplink in a cell-specific manner (see FIG. 17).

(Non-Contention RACH)

Also, in the event of a non-contention RACH, the third method illustrated in FIG. 16C is used for an uplink-downlink anchor carrier pair in the same way as with a contention RACH. In this case, a cell-specific uplink-downlink pair is always used, so that only the base station alone selects a preamble sequence taking into account other UEs to use the same uplink-downlink pair. Furthermore, in this case, it is possible to transmit RACH responses for several UEs, by subframes using the same pair. On the other hand, with the first method illustrated in FIG. 16A and the second method illustrated in FIG. 16B, the uplink-downlink pair is UE-specific, and it is therefore necessary to select a preamble sequence carefully taking into account the UE-specific pair. Furthermore, in this case, a RACH response also needs to be issued carefully.

Another aspect of the present invention focuses upon the fact that a DCI (format 1A) is prepared in the PDCCH common search space, and, as with the DCI (format 1A) of the common search space, the same operation as in LTE is supported.

In LTE, as DCI configurations to be placed in the common search space, DCI format 0/3/3A and DCI format 1A/1C are defined. DCI format 0 is a format for transmitting uplink PUSCH scheduling information and DCI format 3/3A is a format for transmitting a 2-bit/1-bit transmission power command to a plurality of users, and these are therefore difficult to use for downlink control information. On the other hand, DCI format 1 is a format for transmitting PDSCH scheduling information (flexible RB arrangement) and DCI format 1A is a format for transmitting PDSCH scheduling information (compact scheduling), and these therefore can be used to transmit downlink control information.

Then, DCI format 1 or 1A to be multiplexed upon the common search space is selected as an anchor DCI that supports the same operation as in LTE, and even while the CIF is "ON," a CIF is controlled not to be added to the anchor DCI (DCI format 1 or 1A) of the common search space.

DCI format 0/3/3A and anchor DCI to be multiplexed on the common search space preferably have the same number of bits. For example, the combination of DCI format 3 and DCI format 1A has the same number of bits, so that the mobile station is able to complete demodulation by performing blind decoding once.

By this means, even during the transition period in which the CIF is switched ON/OFF, it is possible to perform communication, via a common search space in which an anchor DCI having the same DCI configuration as in LTE, is present.

Figure 10:
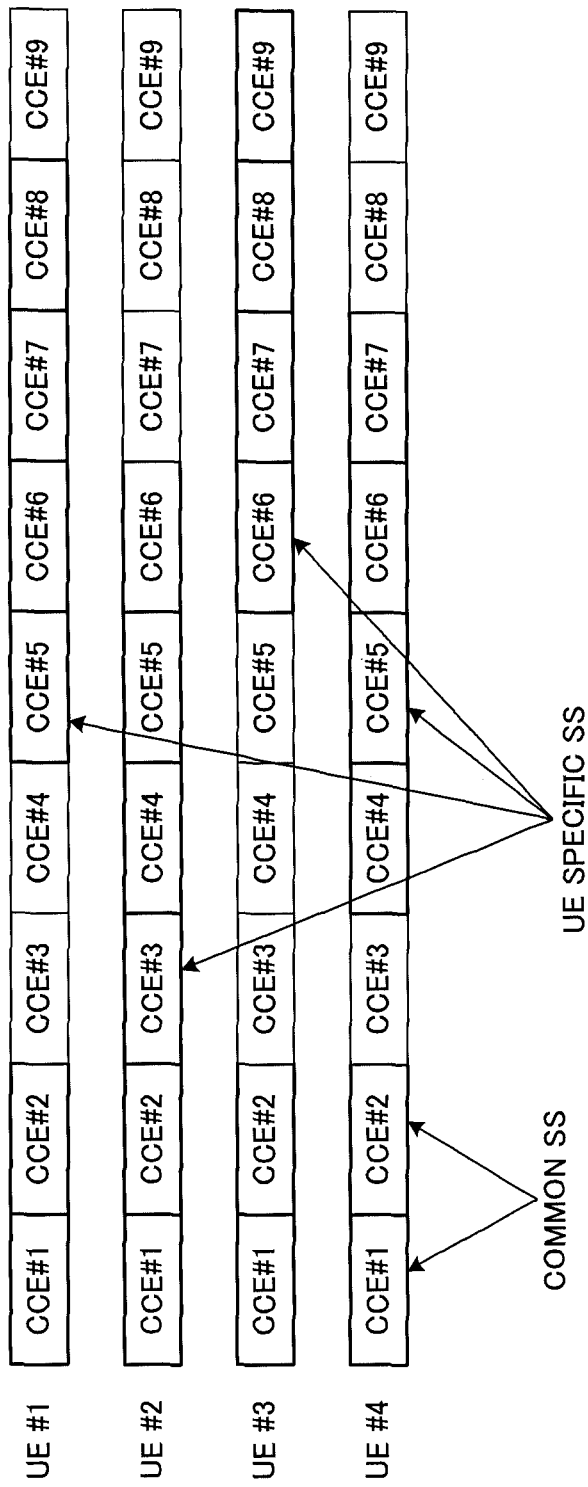
FIG. 10 is a diagram for explaining two types of search spaces.

Now, communication involving a common search space in which an anchor DCI to support the same operation as in LTE (Release 8) is present, will be described in detail. FIG. 10 illustrates examples of two types of search spaces that serve as ranges of blind decoding. As described above, in LTE, two types of search spaces are defined. User common control information refers to a control channel to transmit information that all user terminals connected to the same cell need to receive at the same time, and transmits broadcast information, paging information, resource allocation information for transmission power control signal transmission and so on. The user-specific control information is a control channel for transmitting information which only one user terminal needs to receive, and transmits resource allocation information for uplink/downlink shared data channel transmission and so on. As illustrated in FIG. 10, two types of search spaces, namely a common search space and a user-specific search space, are defined in association with the above two types of control information. The common search space is placed in a position that is common between all user terminals (that is, placed in CCE #1 and CCE #2, which are the top two CCEs). The user-specific search space is arranged in a separate position per user terminal (that is, placed randomly based on user IDs and subframe numbers). In particular, the common search space supports two types of formats (1A and 1C), and, to make a user terminal on a cell edge capable of high quality reception, uses only 4 and 8-CCE aggregations. The number of times to perform blind decoding is 4 and 2. The present invention selects DCI format 1A that is supported by the common search space as an anchor DCI, supports the same operation as in LTE with the anchor DCI, and signals anchor DCIs separately for each user.

Figure 11:
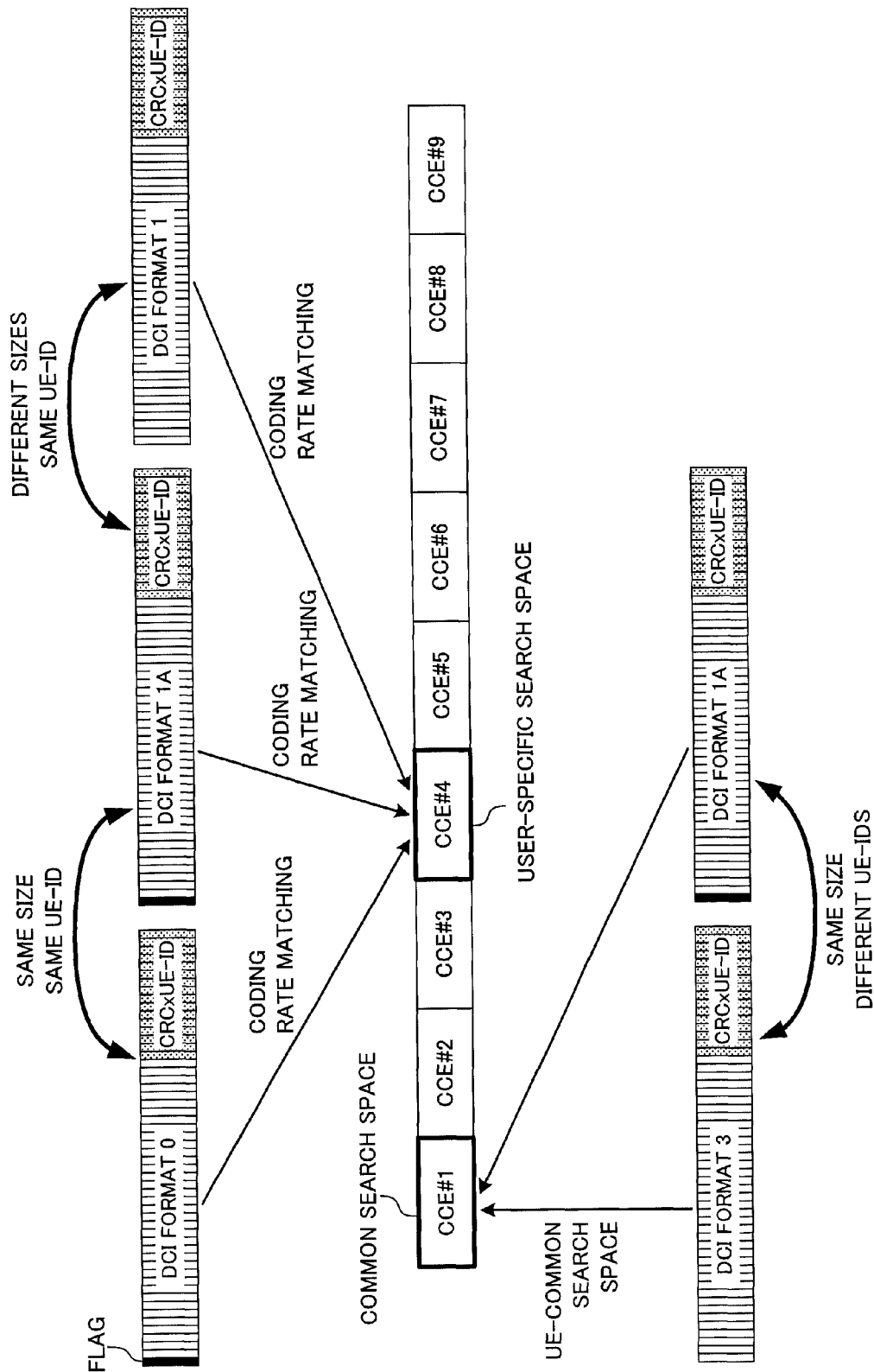
FIG. 11 is a diagram for explaining the types of DCI formats to place in a common search space and a user-specific search space.

FIG. 11 is a diagram for explaining the types of DCI formats to place in the common search space and user-specific search space. In the common search space (CCE #1), two DCIs, namely DCI format 3 and DCI format 1A, are placed. Between these, the DCI (format 1A) having a PDSCH scheduling information transmission format, is selected as an anchor DCI. The DCI (format 1A) selected as an anchor DCI supports the same operation as in LTE, so that the CIF is controlled not to be added even while the CIF is "ON."

The DCI (format 3) and DCI (format 1A) to be placed in the common search space (CCE #1) are assigned different user IDs. To be more specific, one DCI (format 3) is information that is common between all users, and therefore has its CRC part masked by a user ID that is common between all users (by, for example, calculating an exclusive OR). The other DCI (format 1A), which serves as an anchor DCI, has its CRC part masked by a user-specific user ID. The anchor DCI can be demodulated only by individual users having matching user IDs. The user terminal, having successfully demodulated the anchor DCI (DCI format 1A), succeeds in acquiring downlink control information for the user terminal. Here, two of the DCI (format 3) and DCI (format 1A) have the same number of bits, so that the user terminal is able to demodulate the two of the DCI (format 3) and DCI (format 1A) placed in the common search space (CCE #1), by performing blind decoding once.

In the user-specific search space (CCE #4), two DCIs, namely format 0 and format 1A, are placed as the first combination. In the event the CIF is "ON," a CIF configuration, in which a three-bit CIF is added to the DCIs of both format 0 and format 1A, is used. Also, in the event the CIF is "OFF," a DCI configuration, in which a CIF is not added, and which is the same configuration as in LTE, is used.

Format 0 and format 1A have the same number of bits, so that the user terminal can demodulate two of the DCI (format 0) and DCI (format 1A), placed in the user-specific search space (CCE #4), by performing blind decoding once. The user terminal acquires PUSCH scheduling information and PDSCH scheduling information by demodulating two of the DCI (format 0) and DCI (format 1A).

Note that the DCI (format 0) and DCI (format 1A) have the CRC parts masked by the same user ID, so that a one-bit flag is added to the DCIs in order to identify the between the formats.

Also, in the user-specific search space (CCE #4), two DCIs, namely format 1A and format 1, are placed as a second combination. Depending on ON/OFF of the CIF, a three-bit CIF is added to or removed from the DCIs of both format 1A and format 1.

The number of bits varies between format 1A and format 1, and therefore the user terminal can demodulate two of the DCI (format 1A) and DCI (format 1) placed in the user-specific search space (CCE #4) by performing blind decoding twice. The user terminal acquires PUSCH scheduling information and PDSCH scheduling information, by demodulating two of the DCI (format 0) and DCI (format 1A).

Note that, although DCI format 1A and DCI format 1 have the CRC parts masked by the same user ID, the number of bits varies, and therefore it is possible to identify between the formats without flags.

Also, in the user-specific search space (CCE #4), two DCIs, namely format 0 and format 1, are placed as a third combination. Depending on ON/OFF of the CIF, a three-bit CIF is added to or removed from the DCIs of both format 0 and format 1.

The number of bits varies between format 0 and format 1, so that the user terminal can demodulate two of the DCI (format 0) and DCI (format 1) placed in the user-specific search space (CCE #4), by performing blind decoding twice. The DCI (format 0) and DCI (format 1) have the CRC parts masked by the same user ID, and the number of bits varies, and therefore it is possible to identify between the formats without flags.

In this way, by selecting, between two of the DCI (format 3) and DCI (format 1A) placed in the common search space (CCE #1), the DCI (format 1A) in which a format that can transmit PDSCH scheduling information is defined, as an anchor DCI, and guaranteeing the same operation as in LTE by that anchor DCI (DCI format 1A), even during the transition period in which the CIF is switched ON/OFF, it is possible to place a DCI having the same configuration as in LTE in a subframe, and perform communication via the common search space in which the anchor DCI is placed.

Now, an embodiment of the present invention will be described below in detail with reference to the accompanying drawings. Now, a case of using a base station and a mobile station supporting the LTE-A system will be described.

Figure 2:
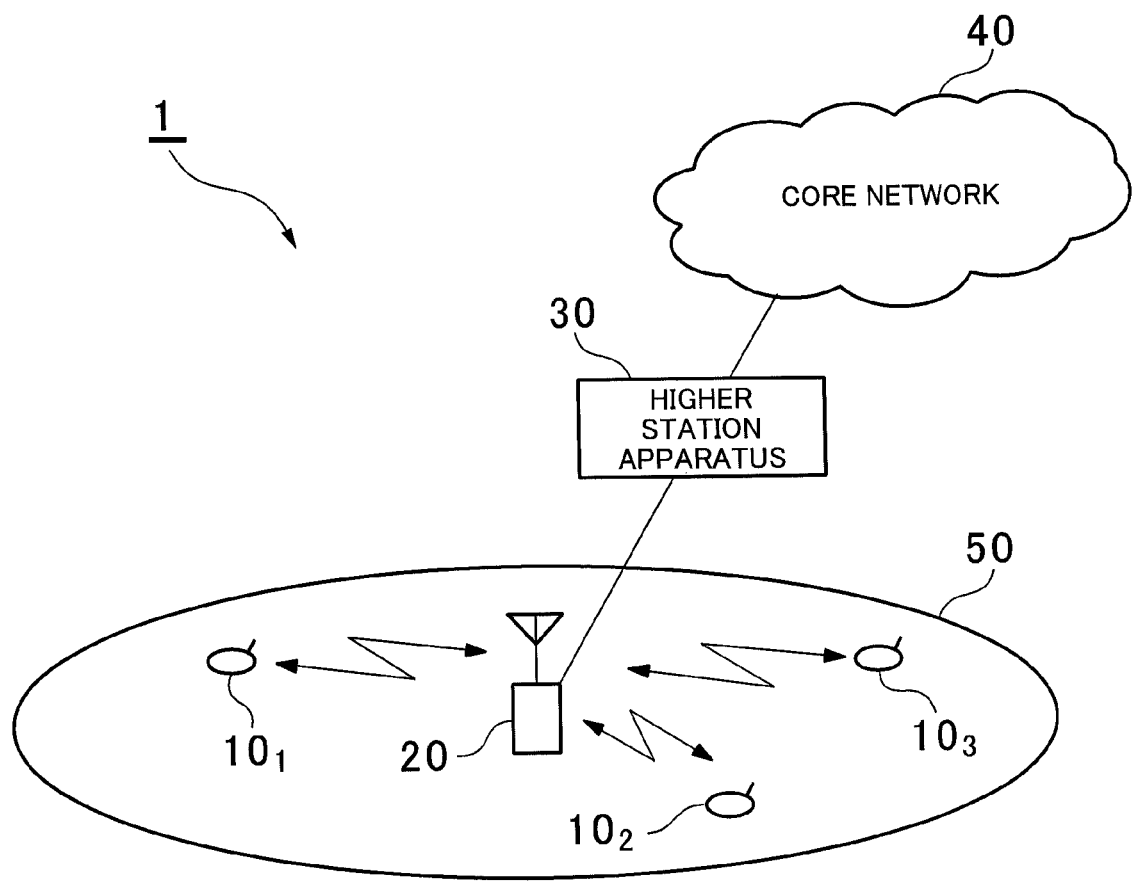
FIG. 2 is an overview of a mobile communication system according to an embodiment.

Referring to FIG. 2, a mobile communication system 1 having a mobile station (UE) 10 and a base station apparatus (Node B) 20 according to an embodiment of the present invention will be described. FIG. 2 is a diagram for explaining a configuration of the mobile communication system 1 having the mobile station 10 and the base station 20 according to the present embodiment. Note that the mobile communication system 1 illustrated in FIG. 2 is a system to accommodate, for example, the LTE system or SUPER 3G. This mobile communication system may be also referred to as IMT-Advanced or may be referred to as 4G.

As illustrated in FIG. 2, the mobile communication system 1 is configured to include the base station apparatus 20 and a plurality of mobile terminal apparatuses 10 ($10_1$, $10_2$, $10_3$, ... $10_n$, where n is an integer to satisfy n>0) that communicate with this base station apparatus 20. The base station apparatus 20 is connected with a higher station apparatus 30, and this higher station apparatus 30 is connected with a core network 40. The mobile terminal apparatus 10 communicates with the base station apparatus 20 in a cell 50. Note that the higher station apparatus 30 includes, for example, an access gateway apparatus, a radio network controller (RNC), a mobility management entity (MME) and so on, but is by no means limited to these.

The mobile terminal apparatuses ($10_1$, $10_2$, $10_3$, ... $10_n$) include LTE terminal and LTE-A terminal, so that the following description will be given with respect to "mobile terminal apparatus 10," unless specified otherwise. Also, although the mobile terminal apparatus 10 performs radio communication with the base station apparatus 20 for ease of explanation, more generally, user apparatuses (UE: User Equipment) including mobile terminal apparatuses and fixed terminal apparatuses may be used.

In the mobile communication system 1, as radio access schemes, OFDMA (Orthogonal Frequency Division Multiple Access) is applied to the downlink, and SC-FDMA (Single-Carrier Frequency-Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system band into bands formed with one or continuous resource blocks, and allowing a plurality of terminals to use mutually different bands.

Here, the communication channels in the LTE system will be described. The downlink communication channels include a PDSCH, which is used by each mobile terminal apparatus 10 on a shared basis, and downlink L1/L2 control channels (including the PDCCH, PCFICH and PHICH). By means of this PDSCH, user data and higher control signals are transmitted. The higher control signals include RRC signaling, which reports increase/decrease of the number of carrier aggregations and the CIF configuration ("ON" and "OFF" of the CIF), to the mobile terminal apparatus 10.

The uplink communication channels include a PUSCH, which is used by each mobile terminal apparatus 10 on a shared basis, and a PUCCH (Physical Uplink Control Channel), which is an uplink control channel. User data is transmitted by means of this PUSCH. Furthermore, the PUCCH adopts intra-subframe frequency hopping, and transmits downlink radio quality information (CQI: Channel Quality Indicator), ACK/NACK, and so on.

Figure 3:
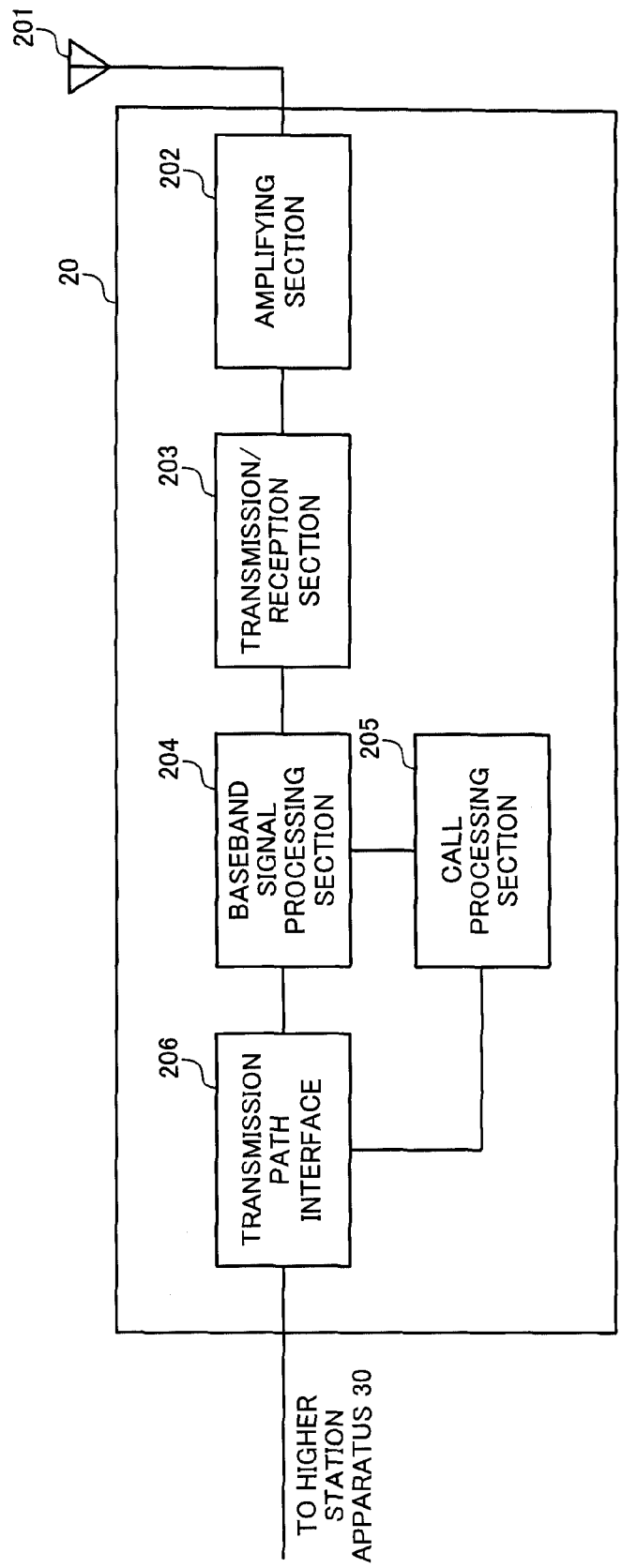
FIG. 3 is a schematic configuration diagram of a base station apparatus according to an embodiment.

Referring to FIG. 3, an overall configuration of the base station apparatus 20 according to the present embodiment will be described. The base station apparatus 20 has a transmission/reception antenna 201, an amplifying section 202, a transmission/reception section 203, a baseband signal processing section 204, a call processing section 205 and a transmission path interface 206.

User data that is transmitted on the downlink from the base station apparatus 20 to the mobile terminal apparatus 10 is input in the baseband signal processing section 204, through the transmission path interface 206, from the higher station apparatus 30.

In the baseband signal processing section 204, PDCP layer processing, RLC (Radio Link Control) layer transmission processing such as division and coupling of user data and RLC retransmission control transmission processing, MAC (Medium Access Control) retransmission control, including, for example, HARQ (Hybrid Automatic Repeat reQuest) transmission processing, scheduling, transport format selection, channel coding, inverse fast Fourier transform (IFFT) processing, and precoding processing, are performed. Furthermore, as with signals of the physical downlink control channel, which is a downlink control channel, transmission processing such as channel coding and inverse fast Fourier transform is performed.

Also, the baseband signal processing section 204 notifies control information for allowing the mobile terminal apparatus 10 to communicate with the base station apparatus 20, to the mobile terminal apparatuses 10 connected to the same cell 50, by a broadcast channel. Broadcast information for communication in the cell 50 includes, for example, the uplink or downlink system bandwidth, identification information of a root sequence (root sequence index) for generating random access preamble signals in the PRACH, and so on.

In the transmission/reception section 203, the baseband signal output from the baseband signal processing section 204 is subjected to frequency conversion processing into a radio frequency band. The amplifying section 202 amplifies the transmission signal subjected to frequency conversion, and outputs the result to the transmission/reception antenna 201.

Meanwhile, as for signals to be transmitted on the uplink from the mobile terminal apparatus 10 to the base station apparatus 20, a radio frequency signal that is received in the transmission/reception antenna 201 is amplified in the amplifying section 202, subjected to frequency conversion and converted into a baseband signal in the transmission/reception section 203, and is input to the baseband signal processing section 204.

The baseband signal processing section 204 performs FFT processing, IDFT processing, error correction decoding, MAC retransmission control reception processing, and RLC layer and PDCP layer reception processing of the user data included in the baseband signal that is received on the uplink. The decoded signal is transferred to the higher station apparatus 30 through the transmission path interface 206.

The call processing section 205 performs call processing such as setting up and releasing a communication channel, manages the state of the base station apparatus 20 and manages the radio resources.

Figure 4:
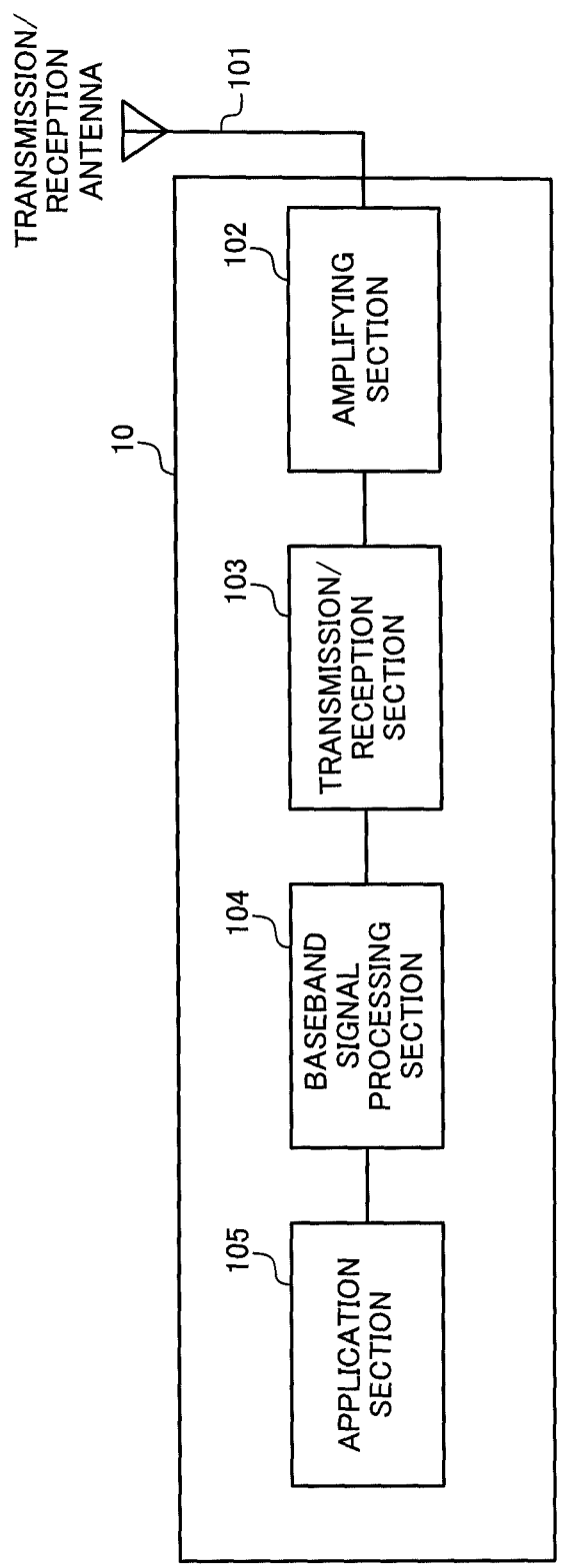
FIG. 4 is a schematic configuration diagram of a mobile terminal apparatus according to an embodiment.

Next, referring to FIG. 4, an overall configuration of the mobile terminal apparatus 10 according to the present embodiment will be described. An LTE terminal and an LTE-A terminal have the same hardware configurations in the principle parts, and therefore will be described indiscriminately. The mobile terminal apparatus 10 has a transmission/reception antenna 101, an amplifying section 102, a transmission/reception section 103, a baseband signal processing section 104 and an application section 105.

As for downlink data, a radio frequency signal received in the transmission/reception antenna 101 is amplified in the amplifying section 102, and subjected to frequency conversion and converted into a baseband signal in the transmission/reception section 103. This baseband signal is subjected to FFT processing, error correction decoding and reception processing such as retransmission control and so on in the baseband signal processing section 104. In this downlink data, downlink user data is transferred to the application section 105. The application section 105 performs processing related to higher layers above the physical layer and the MAC layer. Also, in the downlink data, broadcast information is also transferred to the application section 105.

On the other hand, uplink user data is input from the application section 105 to the baseband signal processing section 104. In the baseband signal processing section 104, retransmission control (HARQ (Hybrid ARQ)) transmission processing, channel coding, DFT processing, IFFT processing and so on are performed. The baseband signal output from the baseband signal processing section 104 is subjected to frequency conversion processing in the transmission/reception section 103 and converted into a radio frequency band, and, after that, amplified in the amplifying section 102 and transmitted from the transmission/reception antenna 101.

Figure 5:
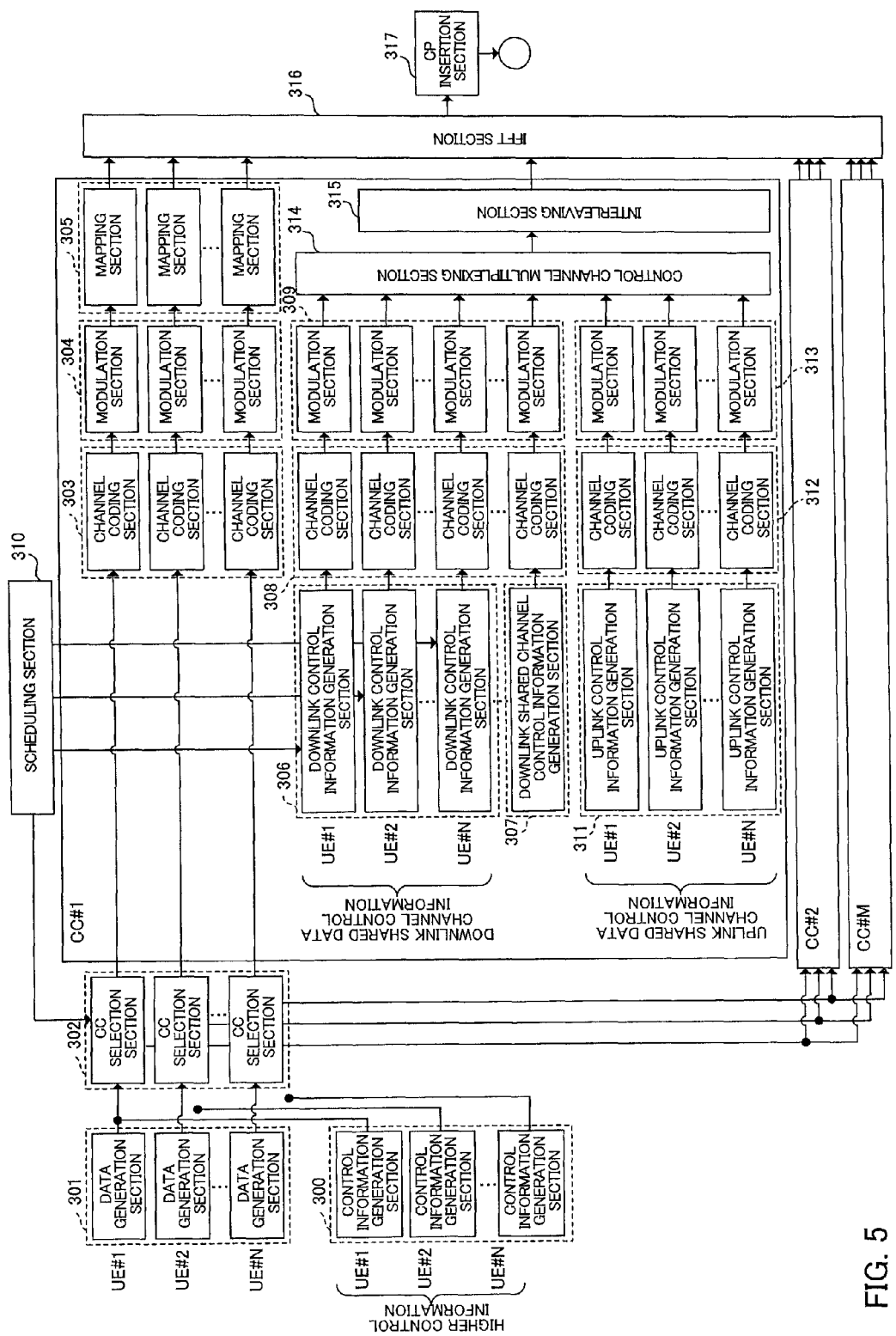
FIG. 5 is a functional block diagram of a transmission processing section in a baseband signal processing section in a base station apparatus according to an embodiment.

FIG. 5 is a functional block diagram of a baseband signal processing section 204 and part of the higher layers provided in the base station apparatus 20 according to the present embodiment, and primarily illustrates the function blocks of the transmission processing section in the baseband signal processing section 204. FIG. 5 illustrates an example of a base station configuration which can support maximum M (CC #1 to CC #M) component carriers. Transmission data for the mobile terminal apparatus 10 under the base station apparatus 20 is transferred from the higher station apparatus 30 to the base station apparatus 20.

A control information generation section 300 generates higher control signals for performing higher layer signaling (for example, RRC signaling), on a per user basis. The higher control signals may include designation of the carrier number of the anchor carrier, addition/removal of component carriers, and command to request CIF "ON" and "OFF." Assignment of component carriers is controlled so that an anchor carrier is always present amongst component carriers that are assigned. Also, a rule for not requesting CIF "ON" is applied to the anchor carrier, so as to support the same operation as in LTE with the anchor carrier.

The data generation section 301 outputs the transmission data transferred from the higher station apparatus 30 separately as user data.

The component carrier selection section 302 selects component carriers to use in radio communication with the mobile terminal apparatus 10 on a per user basis. As described above, addition/removal of component carriers is reported from the base station apparatus 20 to the mobile terminal apparatus 10 by RRC signaling, and a complete message is received from the mobile terminal apparatus 10. As this complete message is received, assignment (addition/removal) of component carriers to that user is fixed, and the fixed component carrier assignment is set in the component carrier selection section 302 as component carrier assignment information. In accordance with the component carrier assignment information that is set in the component carrier selection section 302 on a per user basis, higher control signals and transmission data are allocated to the component carrier channel coding section 303 of the applicable component carrier. Component carriers are assigned so that the anchor carrier is included in the component carriers selected by the component carrier selection section 302.

The scheduling section 310 controls assignment of component carriers to a serving mobile terminal apparatus 10 according to overall communication quality of the system band. The scheduling section 310 determines addition/removal of component carriers to assign for communication with the mobile terminal apparatus 10. A decision result related to addition/removal of component carriers is reported to the control information generation section 300.

The scheduling section 310 determines the DCI configuration ("ON" and "OFF" of the CIF) of component carriers. In the event of switching the DCI configuration (for example, "ON" and "OFF" of the CIF) to be applied to each component carrier, a request is sent to the control information generation section 300 to give switch of "ON" and "OFF" of the CIF, by RCC signaling.

Also, the scheduling section 310 performs resource allocation in component carriers CC #1 to CC #M. The LTE terminal user and the LTE-A terminal user are scheduled separately. Also, the scheduling section 310 receives as input the transmission data and retransmission command from the higher station apparatus 30, and also receives as input the channel estimation values and resource block CQIs from the reception section having measured an uplink signal. The scheduling section 300 schedules uplink/downlink control signals and uplink/downlink shared channel signals with reference to the retransmission command input from the higher station apparatus 30, the channel estimation values and CQIs that are received as input from the higher station apparatus 30. A propagation path in mobile communication varies differently per frequency, due to frequency selective fading. So, upon transmission of user data to the mobile terminal apparatus 10, resource blocks of good communication quality are assigned to each mobile terminal apparatus 10, on a per subframe basis (referred to as "adaptive frequency scheduling"). In adaptive frequency scheduling, for each resource block, a mobile terminal apparatus 10 of good propagation path quality is selected and assigned. Consequently, the scheduling section 300 assigns resource blocks using the CQI of each resource block, fed back from each mobile terminal apparatus 10. Also, the MCS (Coding rate and Modulation Scheme) that fulfills a required block error rate with the assigned resource blocks is determined. Parameters to fulfill the MCS (Coding rate and Modulation Scheme) determined by the scheduling section 310 are set in the channel coding section 303, 308 and 312, and in the modulation sections 304, 309 and 313.

The baseband signal processing section 204 has channel coding sections 303, modulation sections 304, and mapping sections 305, to match the maximum number of users to be multiplexed, N, in one component carrier. The channel coding section 303 performs channel coding of the shared data channel (PDSCH), formed with user data (including part of higher control signals) that is output from the data generation section 301, on a per user basis. The modulation section 304 modulates user data having been subjected to channel coding, on a per user basis. The mapping section 305 maps the modulated user data to radio resources.

Also, the baseband signal processing section 204 has a downlink control information generation section 306 that generates downlink shared data channel control information, which is user-specific downlink control information, and a downlink shared channel control information generation section 307 that generates downlink shared control channel control information, which is user common downlink control information.

The downlink control information generation section 306 generates downlink control signals (DCI) from the resource allocation information, MCS information, HARP information, PUCCH transmission power control command, which are determined on a per user basis. Here, amongst the component carriers assigned to the user, downlink shared data channel control information to support the same operations as in LTE are generated in the anchor carrier. To be more specific, in the search space which has a DCI configuration that does not add a CIF and which is determined according to the rules defined in LTE, the DCI is set. In the component carriers assigned to the user, information as to which component carrier is the anchor carrier is reported from the scheduling section 310.

The baseband signal processing section 204 has channel coding sections 308 and modulation sections 309 to match the maximum number of users to be multiplexed, N, in one component carrier. The channel coding section 308 performs channel coding of control information generated in the downlink control information generation section 306 and downlink shared channel control information generation section 307, on a per user basis. The modulation section 309 modulates the downlink control information after channel coding.

Also, the baseband signal processing section 204 has an uplink control information generation section 311 that generates, on a per user basis, uplink shared data channel control information, which is control information for controlling an uplink shared data channel (PUSCH), a channel coding section 312 that performs, on a per user basis, channel coding of uplink shared data channel control information generated, and a modulation section 313 that modulates, on a per user basis, uplink shared data channel control information subjected to channel coding.

The control information that is modulated on a per user basis in the above modulation sections 309 and 313 is multiplexed in the control channel multiplexing section 314 and furthermore interleaved in an interleaving section 315. A control signal that is output from the interleaving section 315 and user data that is output from the mapping section 305 are input in an IFFT section 316 as downlink channel signals. The IFFT section 316 converts the downlink channel signal from a frequency domain signal into a time sequence signal by performing an inverse fast Fourier transform. A cyclic prefix insertion section 317 inserts cyclic prefixes in the time sequence signal of the downlink channel signal. Note that a cyclic prefix functions as a guard interval for cancelling the differences in multipath propagation delay. The transmission data to which cyclic prefixes are added, is transmitted to the transmission/reception section 203.

Figure 6:
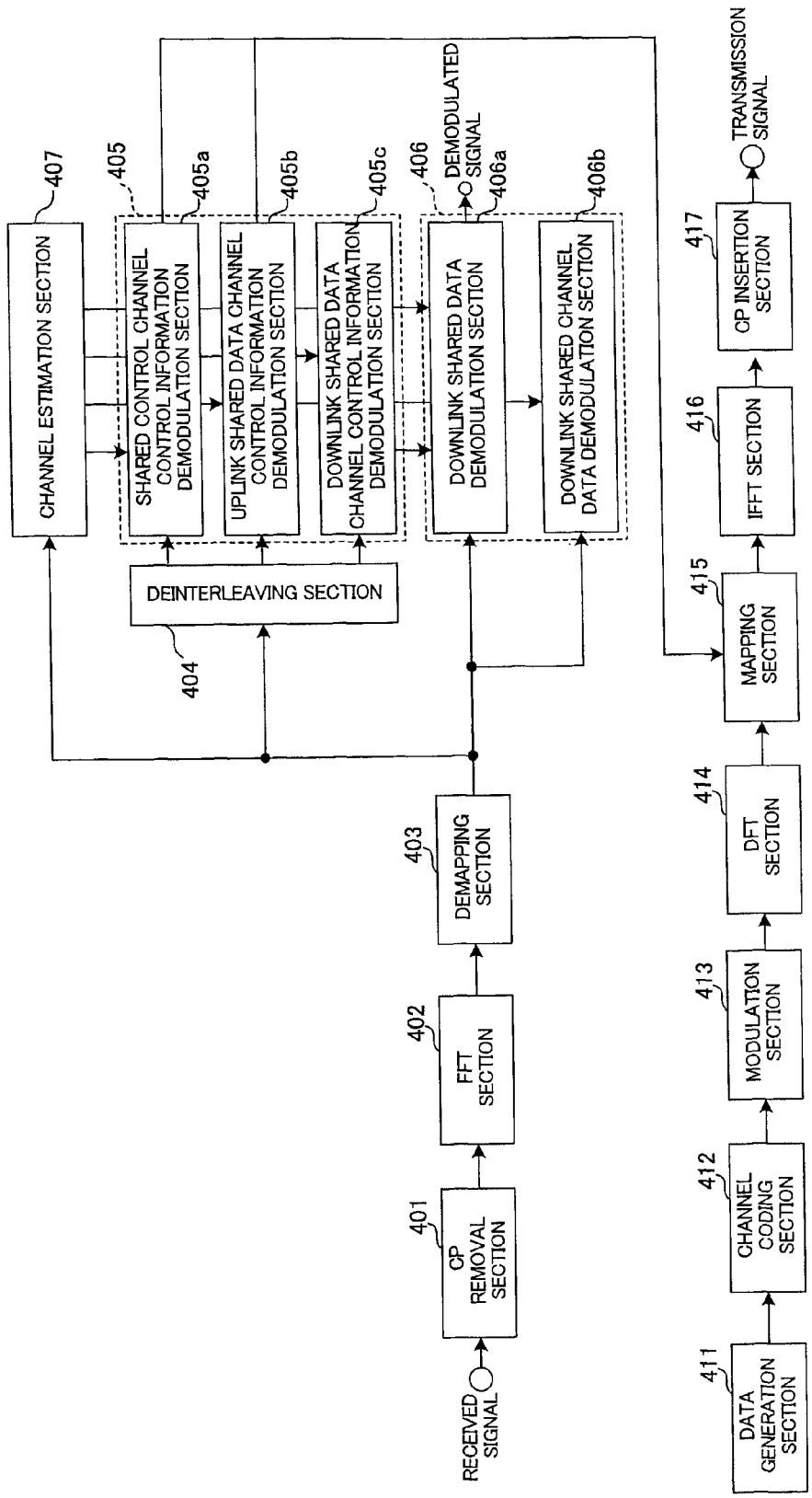
FIG. 6 is a functional block diagram of a baseband signal processing section provided in a mobile terminal apparatus according to an embodiment.

FIG. 6 is a functional block diagram of a baseband signal processing section 104 provided in the mobile terminal apparatus 10, illustrating function blocks of an LTE-A terminal which supports LTE-A. First, the downlink configuration of the mobile terminal apparatus 10 will be described.

The CP removing section 401 removes the CPs from a downlink signal received from the radio base station apparatus 20 as received data. The downlink signal, from which the CPs have been removed, is input in a FFT section 402. The FFT section 402 performs a fast Fourier transform (FFT) on the downlink signal, converts the time-domain signal into a frequency domain signal, and inputs the frequency domain signal into a demapping section 403. The demapping section 403 demaps the downlink signal, and extracts, from the downlink signal, multiplex control information in which a plurality of pieces of control information are multiplexed, user data, and higher control signals. Note that the demapping process by the demapping section 403 is performed based on higher control signals that are received as input from the application section 105. Multiplex control information that is output from the demapping section 403 is deinterleaved in the deinterleaving section 404.

Also, the baseband signal processing section 104 has a control information demodulation section 405 that demodulates control information, a data demodulation section 406 that demodulates downlink shared data, and a channel estimation section 407. The control information demodulation section 405 includes a shared control channel control information demodulation section 405a that demodulates downlink shared control channel control information from multiplex control information, an uplink shared data channel control information demodulation section 405b that demodulates uplink shared data channel control information from multiplex control information, and a downlink shared data channel control information demodulation section 405c that demodulates downlink shared data channel control information from multiplex control information. The data demodulation section 406 includes a downlink shared data demodulation section 406a that demodulates the user data and higher control signals, and a downlink shared channel data demodulation section 406b that demodulates downlink shared channel data.

The shared control channel control information demodulation section 405a extracts shared control channel control information, which is user common control information, by the blind decoding process of the common search space of multiplex control information (PDCCH), demodulation process, channel decoding process and so on. The shared control channel control information includes downlink channel quality information (CQI), and therefore is input in the mapping section 115 (described later), and mapped as part of transmission data for the radio base station apparatus 20.

The uplink shared data channel control information demodulation section 405b extracts uplink shared data channel control information, which is user-specific uplink control information, by the blind decoding process of the user-specific search space of multiplex control information (PDCCH), demodulation process, channel decoding process and so on. The uplink shared data channel control information is used to control the uplink shared data channel (PUSCH), and is input in the downlink shared channel data demodulation section 406*b*.

The downlink shared data channel control information demodulation section 405*c* extracts downlink shared data channel control information, which is user-specific downlink control signals, by the blind decoding process of the user-specific search space of multiplex control information (PDCCH), demodulation process, channel decoding process and so on. The downlink shared data channel control information is used to control the downlink shared data channel (PDSCH), and is input in the downlink shared data demodulation section 406.

Also, the downlink shared data channel control information demodulation section 405*c* performs the blind decoding process of the user-specific search space, based on information which relates to the PDCCH and PDSCH and which is included in higher control signals demodulated in the downlink shared data demodulation section 406*a*.

The downlink shared data demodulation section 406*a* acquires the user data, higher control information and so on, based on the downlink shared data channel control information received as input from the downlink shared data channel control information demodulation section 405*c*. The higher control information (including mode information) is output to a channel estimation section 407. The downlink shared channel data demodulation section 406*b* demodulates downlink shared channel data based on the uplink shared data channel control information that is input from uplink shared data channel control information demodulation section 405*b*.

The channel estimation section 407 performs channel estimation using common reference signals. The estimated channel variation is output to the shared control channel control information demodulation section 405*a*, the uplink shared data channel control information demodulation section 405*b*, the downlink shared data channel control information demodulation section 405*c* and the downlink shared data demodulation section 406*a*. These demodulation sections demodulate downlink signals using the estimated channel variation and demodulation reference signals.

The baseband signal processing section 104 has, as function blocks of the transmission processing system, a data generation section 411, a channel coding section 412, a modulation section 413, a DFT section 414, a mapping section 415, an IFFT section 416, and a CP insertion section 417. The data generation section 411 generates transmission data from bit data that is received as input from the application section 105. The channel coding section 412 applies channel coding processing such as error correction to the transmission data, and the modulation section 413 modulates the transmission data subjected to channel coding by QPSK and so on. The DFT section 414 performs a discrete Fourier transform on the modulated transmission data. The mapping section 415 maps the frequency components of the data symbols after the DFT to subcarrier positions designated by the base station apparatus. That is to say, each frequency component of the data symbols is input in a subcarrier position in the IFFT section 416 having a bandwidth to match the system band, and 0 is set in other frequency components. The IFFT section 416 performs an inverse fast Fourier transform on input data to match the system band and converts the input data into time sequence data, and the CP insertion section 417 inserts cyclic prefixes in the time sequence data per data division.

Next, the operations in the event the CIF is made "ON" or "OFF" with respect to the DCI configuration that is multiplexed over the downlink control channel of component carriers, will be described.

As illustrated in FIG. 9A, assume that three component carriers CC #1, CC #2 and CC #3 are assigned to user UE #1, and the CIF is "OFF." A case to switch to CIF "ON," as illustrated in FIG. 9B, from the stage illustrated in FIG. 9A, will be described.

The base station apparatus 20 selects one of the three component carriers CC #1, CC #2 and CC #3 assigned to user UE #1, as an anchor carrier. The present invention does not limit the method of selecting an anchor carrier. For example, the smallest number amongst the component carrier numbers may be selected as an anchor carrier, or the component carrier to be an anchor carrier may be shifted periodically. Alternately, an anchor carrier may be selected from component carriers in which the communication quality exceeds a required value.

The base station apparatus 20 reports the component carrier number to be an anchor carrier, to the mobile terminal apparatus 10, which serves as UE #1, by RRC signaling. It is equally possible to report the component carrier number to be an anchor carrier using a broadcast channel. Alternately, it is also possible to determine automatically that the first carrier is an anchor carrier, when communication starts.

In the base station apparatus 20, also, the downlink control information generation section 306 for user UE #1 generates downlink control information, for each of component carriers CC #1, CC #2 and CC #3 assigned to user UE #1. Here, the downlink control information (DCI) to be multiplexed upon the downlink control channel of the anchor carrier is controlled to be configured to meet the LTE specifications, so as to support the same operations as in LTE. To be more specific, the DCI configuration employs a format in accordance with LTE, and the search space for arranging a DCI, in which a CIF is not added, is also determined in the same way as in LTE.

In the base station apparatus 20, the control information generation section 300 generates a command to request "ON" of the CIF, as a higher control signal for user UE #1. The command to request CIF "ON" is input in the CC selection section 302, which selects component carriers for user UE #1. The CC selection section 302 knows that three component carriers CC #1, CC #2 and CC #3 are assigned to user UE #1, and, in the baseband processing section, input the higher control signal including the command, to request CIF "ON," into the channel coding section 303 for each of component carriers CC #1, CC #2 and CC #3. The higher control signal including the command to request CIF "ON" is subjected to channel coding in the channel coding section 303 and modulated in the modulation section 304. Furthermore, the result is mapped to the downlink shared data channel of component carriers CC #1, CC #2 and CC #3 by the mapping section 305, and converted into a time domain signal and transmitted in the IFFT section 316.

As described above, in synchronization with reporting of RRC reconfiguration (CIF configuration), the DCI configuration that is generated in the downlink control information generation section 306 is switched to a CIF configuration. The downlink control information generation section 306 generates a downlink control information signal having a DCI configuration in which a CIF is added. As illustrated in FIG. 9B, a DCI configuration, in which a CIF is added, is multiplexed over the downlink control channel of three component carriers CC #1, CC #2 and CC #3, that are assigned to user UE

1. However, in the downlink control channel of the anchor carrier, a DCI, in which a CIF is not added, is always placed in a predetermined search space.

Figure 14:
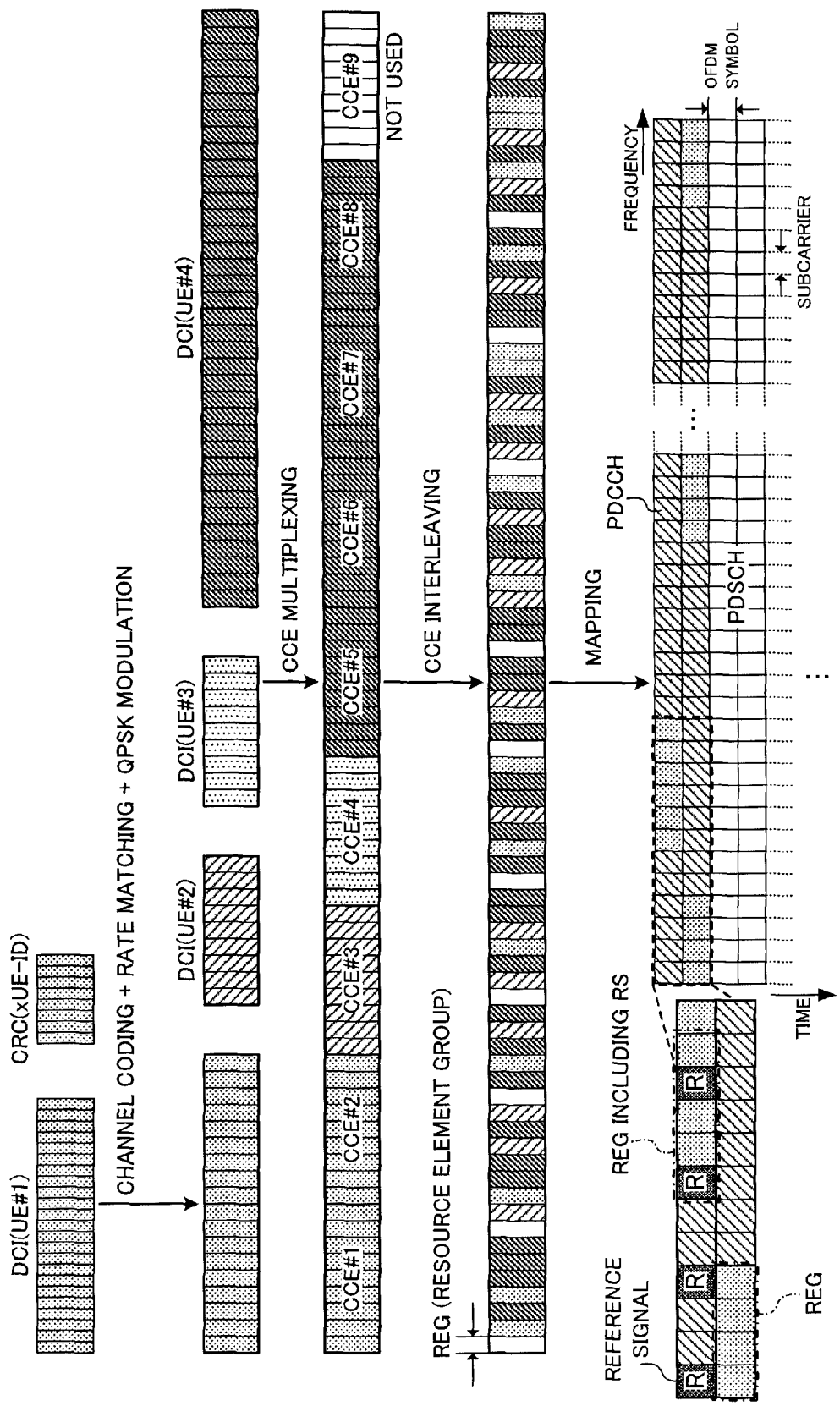
FIG. 14 is a diagram of a processing flow up to where a DCI is mapped to a predetermined region in a PDCCH.

FIG. 14 shows the processing flow up to where a DCI is mapped in a predetermined region of the PDCCH. First, the DCI configuration that is generated in the downlink control information generation section 306 will be described. The DCI format defined in the LTE is formed with resource allocation information (resource block assignment) per terminal, MCS information (Modulation and Coding Scheme) for the assigned resource blocks, or transport block information, and information that is used to correct data reception errors to occur on the terminal side with high efficiency and low delay, and that is necessary when using hybrid ARQ—to be more specific, the memory number that applies when transmitting for the first time and synthesizing retransmission packets, that is to say, the HARQ process number, an identifier (new data indicator) to identify between new data and retransmission data, information (redundancy version) to show which part of the coded sequence is transmitted, and a PUCCH transmission power control command (TPC for PUCCH).

In the CIF configuration, in addition to the above DCI field configuration defined in LTE, a carrier indicator field (CIF) is provided. In the CIF, information (three bits) that can specify the carrier number of the component carrier assigned to the PDSCH to be demodulated by DCI information is set.

As illustrated in FIG. 14, the channel coding section 308 adds a CRC masked by the user ID (UE-ID), to downlink control information (DCI) of the user terminal to be multiplexed in the same subframe, and, after that, performs channel coding. Also, depending on the reception quality of each user terminal, rate matching to 72, 144, 288, and 576 bits is performed (in the event of 72 bits or 576 bits, the coding rates of ⅔ and 1/12 are equivalent). Now, by defining 72 bits as the fundamental unit (CCE: Control Channel Element), an optimal number of CCEs is determined, from four types of the numbers of CCEs defined={1, 2, 4, 8}, depending on reception quality. The number of CCEs is reported from the scheduling section 310. Furthermore, after QPSK modulation in the modulation section 309, control information for a plurality of user terminals is multiplexed in the control channel multiplexing section 314 (CCE multiplexing). To achieve a frequency diversity effect, the interleaving section 315 performs interleaving (CCE interleaving) per REG (which is an abbreviation for "Resource Element Group" and is formed with four REs). After that, the result is mapped to the top of the subframe.

In mobile terminal apparatus 10, which serves as user UE #1, the downlink shared data demodulation section 406a demodulates a higher control signal. The modulated higher control signal is passed to a higher layer of the application section 105. The application section 105 interprets the higher control signal and detects a command to request CIF "ON." The application section 105 reports switch to CIF "ON," to the control information demodulation section 405. When CIF "ON" is reported, the control information demodulation section 405 performs blind decoding based on a DCI size that takes into account the DCI format and the number of CIF bits.

Figure 15:
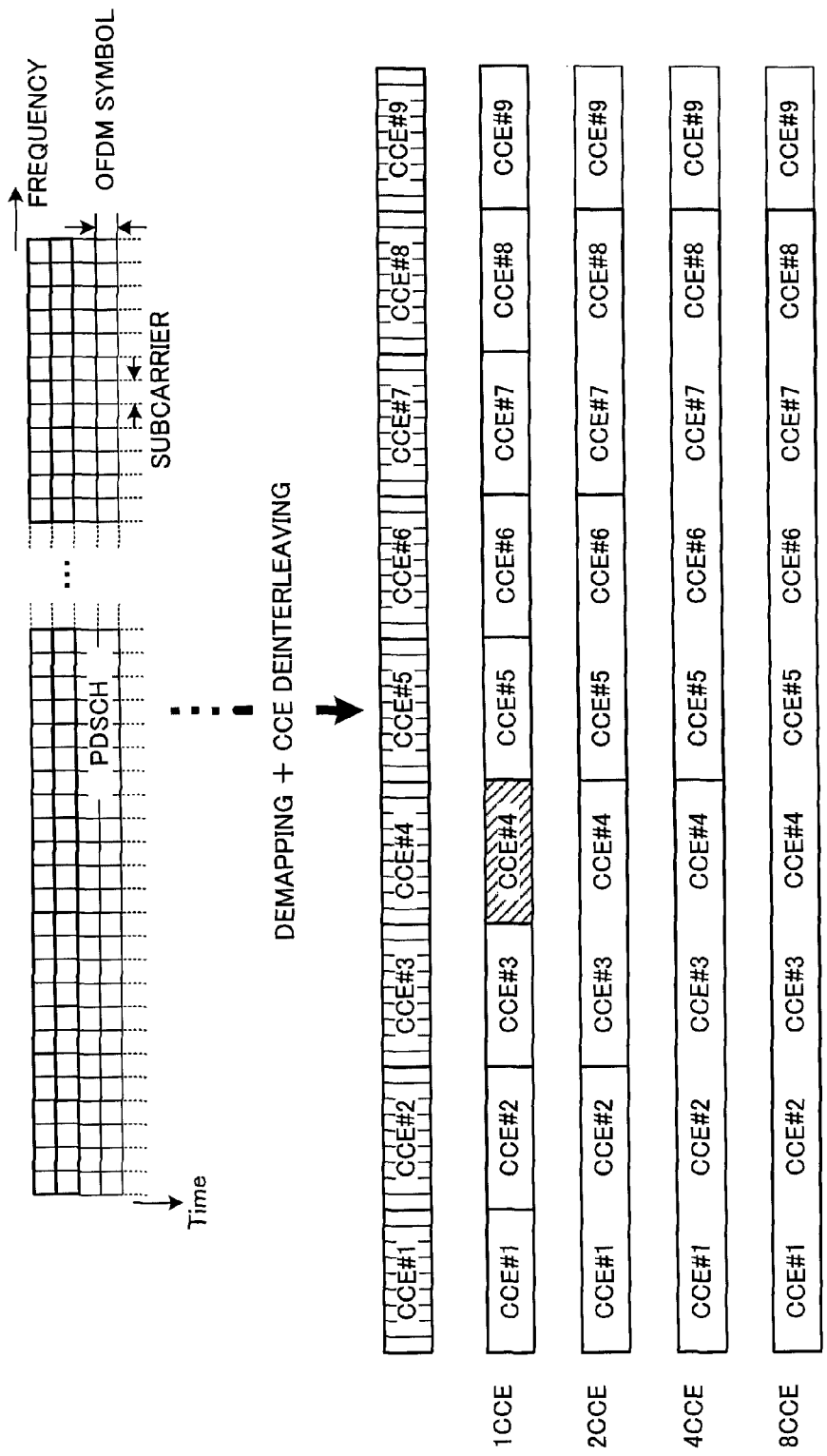
FIG. 15 is a conceptual diagram of demapping and CCE deinterleaving in a receiver.

To be more specific, as illustrated in FIG. 15, in the mobile terminal apparatus 10, the deinterleaving section 404 deinterleaves the PDCCH mapped to the first through third OFDM symbols at the top of the subframe. The rate matching parameter (the number of CCEs) and the CCE starting position are not clear, and therefore the mobile terminal apparatus 10 performs blind decoding per CCE and searches for a CCE where the CRC masked by the user ID is "OK." With the example illustrated in FIG. 15, the detection succeeds in CCE #4.

As described above, the component carrier number to serve as the anchor carrier is reported to the mobile terminal apparatus 10 by a higher control signal. The application section 105 reports the anchor carrier to the control information demodulation section 405. Upon demodulating the DCI from the downlink control channel of the anchor carrier, the control information demodulation section 405 performs blind decoding in the same operations as in LTE. Given that the anchor carrier is supported the same operation as in LTE, even during the transition period of "ON" and "OFF" of the CIF, as illustrated in FIG. 9B, a DCI, in which a CIF is not added, is present in the search space defined in LTE. Even if, as illustrated in FIG. 9B, a DCI in which a CIF is added in multiplexed upon the downlink control channel of the anchor carrier and the decoding fails, it is still possible to correctly decode the DCI in which a CIF is added, and therefore it is possible to demodulate the PDSCH.

The data generation section 411 of the mobile terminal apparatus 10 generates a complete message, which accepts switch to CIF "ON." The complete message is mapped to the PUSCH in the mapping section 415 and transmitted.

On the other hand, upon switch from "ON" to "OFF" the CIF, in synchronization with the reporting of the command to switch to CIF "OFF," the DCI configuration to be generated in the downlink control information generation section 306 is also switched to a DCI configuration in which a CIF is not added. In this case, too, the anchor carrier (CC #1) is supported the same operation as in LTE, and no change is made to the DCI configuration placed in the search space, determined in accordance with LTE specifications. Consequently, even if the mobile terminal apparatus 10 receives a DCI in which a CIF is not added before switch to a DCI configuration in which a CIF is not added, it is possible to demodulate the specific DCI of the anchor carrier (CC #1).

Figure 12:
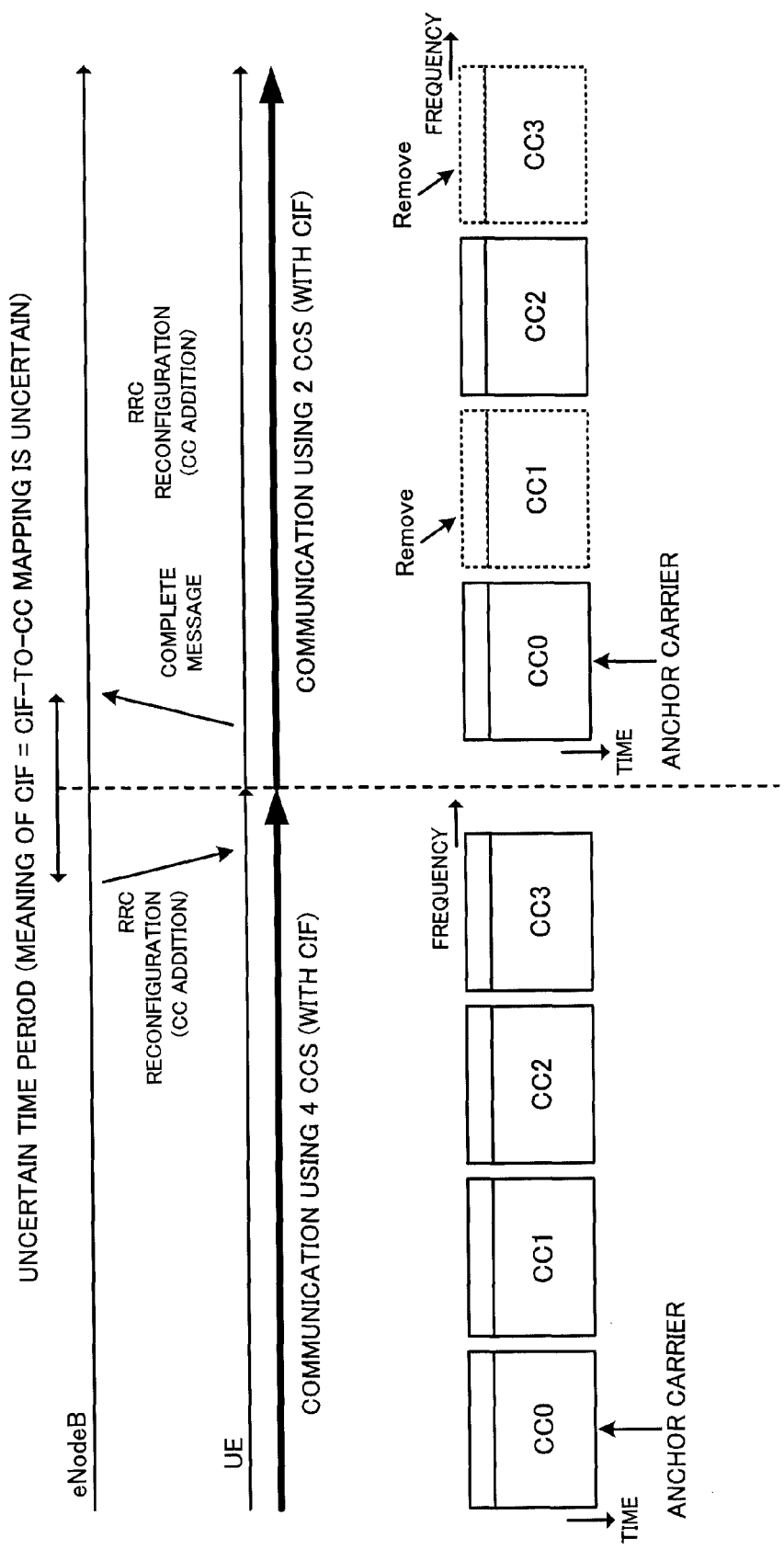
FIG. 12 is a sequence diagram in the event there is change to assignment of component carriers to users.

FIG. 12 illustrates an example of a case where change occurs to assignment of component carriers to UE #1. The number of carrier aggregations of component carriers for user UE #1 changes from 4 to 2. Note that the CIF is "ON" before and after removal of component carriers.

Figures 13A, 13B:
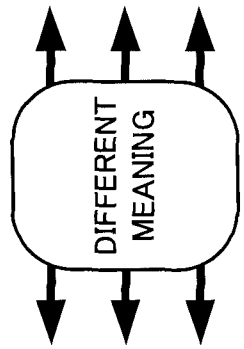
FIG. 13A is a configuration diagram of a CIF table corresponding to the number of component carriers=4.
FIG. 13B is a configuration diagram of a CIF table corresponding to the number of component carriers=2.

First, in the stage four component carriers CC0 to CC3 are assigned to user UE #1, a CIF table corresponding to the number of component carriers=4 is given by RRC signaling. The mobile terminal apparatus 10 of user UE #1 specifies the component carrier number from the bit pattern of the CIF, using the CIF table given by RRC signaling. FIG. 13A illustrates an example of a configuration of a CIF table corresponding to the number of component carriers=4.

As illustrated in FIG. 12, the component carriers to assign to user UE #1 are changed from four component carriers CC0 to CC3, to two component carriers CC0 and CC2. In this case, a new CIF table corresponding to the number of component carriers=2 is given by RRC signaling. FIG. 13B illustrates an example of a configuration of the new CIF table corresponding to the number of component carriers=2.

In the CIF table (FIG. 13A) corresponding to the number of component carriers=4, "010" is the carrier number of the component carrier CC2, while, in the CIF table (FIG. 13B) corresponding to the number of component carriers=2, "001" is the carrier number of the component carrier CC2. Consequently, in the transition period in which component carriers are added or removed, which requires change of the CIF table, a PDSCH demodulation error occurs in the mobile terminal apparatus 10, due to referencing the CIF table before switch.

With the present invention, the anchor carrier supports the same operation as in LTE, and therefore a DCI, in which a CIF is not added, is placed in the search space that is determined in accordance with LTE specifications. Consequently, there is no need to reference the CIF table even during the transition period in which component carriers are added/removed, which involves change of the CIF table, so that it is possible to demodulate the DCI and maintain stable communication.

Next, communication to place an anchor DCI that supports the same operation as in LTE, in the common search space, will be described in detail.

As illustrated in FIG. 11, the DCI (format 1A) that is placed in the common search space of the PDCCH, which serves as a downlink control channel for each component carrier, is selected as an anchor DCI, and uplink/downlink shared data channel control information is set in the anchor DCI and reported to individual users.

Consequently, the downlink control information generation section 306 generates anchor DCIs on a per user basis. In the anchor DCI reported to each individual user, the CRC is masked by the individual user ID (that is, masked by calculating an exclusive OR of the CRC and the individual user ID). The anchor DCI generated for each individual user in each component carrier is placed in the top two CCEs (CCE #1 and CCE #2), which serve as the common search space. The CIF is controlled not to be added to the anchor DCI even while the CIF is "ON."

In the mobile terminal apparatus 10, the shared control channel control information demodulation section 405a performs the blind decoding process of the common search space of multiplex control information (PDCCH). The anchor DCI (DCI format 1A) and DCI (DCI format 3) are decoded by performing blind decoding once. However, CRC check is performed twice because the anchor DCI (DCI format 1A) is masked by the user ID of each individual user. By demodulating and decoding DCI format 3, shared control channel control information, which is user common control information, is extracted. The shared control channel control information includes downlink channel quality information (CQI), input in the mapping section 115 (described later), and mapped as part of transmission data for the base station apparatus 20. Also, by demodulating and decoding the anchor DCI (DCI format 1A), downlink control information for the user-specific shared data channel is extracted. The downlink control information is input in the downlink shared data demodulation section 406a.

Also, the downlink shared data channel control information demodulation section 405c extracts user-specific downlink control information that is multiplexed in the user-specific search space of the PDCCH and transmitted, by performing the blind decoding process of the user-specific search space of multiplex control information (PDCCH). The downlink control information is input to the downlink shared data demodulation section 406a.

The downlink shared data demodulation section 406a acquires the user data and higher control information, based on the downlink shared data channel control information that is received as input from the shared control channel control information demodulation section 405a and downlink shared data channel control information demodulation section 405c.

In this way, given that an anchor DCI to support the same operation as in LTE is placed in the common search space, it is possible to perform communication via the common search space in which the anchor DCI is placed, even during the transition period in which ON/OFF of the CIF is switched.

Note that the present invention is by no means limited to the above embodiment. The present specification contains the disclosure of the following inventions. For example, upon performing PDSCH RLC retransmission, the base station apparatus performs transmission in two different DCI sizes, using a DCI in which a CIF is added and a DCI in which a CIF is not added. Then, in the event correct reception of the PDSCH is acknowledged by ACK/NACK with respect to either DCI size, the base station apparatus continues performing signaling using the DCI size (presence/absence of the CIF) has been correctly received by the mobile terminal.

Also, as another method, when the mobile terminal receives a RACH preamble using a specific preamble, or when the mobile terminal receives a C-RNTI MAC control message included in a RACH message, the mobile terminal may transmit a "complete message" using the RACH step. By this means, the base station apparatus is able to easily check that the CIF configuration has been correctly reflected in the mobile terminal.

Also, it is equally possible to determine the presence or absence of the CIF per component carrier, and remove the necessity to configure the CIF in all component carriers at the same time. In this case, at first, the base station apparatus newly sets the presence or absence of the CIF only for part of the component carriers, and, in other component carriers, maintains the CIF configuration (presence/absence) used up till then. In the event the initial CIF setting is checked, the base station apparatus sets the presence or absence of the CIF with respect to the rest of the component carriers.

The above method also makes it possible to solve the instability during the transition period in which ON/OFF of the CIF is switched.

The disclosure of Japanese Patent Application No. 2010-030629, filed on Feb. 15, 2010, including the specification, drawings, and abstract, is incorporated herein by reference in its entirety.

The invention claimed is:

1. A radio communication system in which a first communication system and a second communication system are arranged in an overlapping manner, the radio communication system comprising:
a base station apparatus communicating in the first and second communication systems; and
a user terminal communicating with the base station;
the first communication system adding or removing a frequency band to assign for communication between the base station apparatus and the user terminal on a per fundamental frequency block basis, and the second communication system performing communication between the base station apparatus and the user terminal via one fixed fundamental frequency block, wherein:
in the first communication system, one of fundamental frequency blocks assigned to the user terminal is determined as an anchor block, and the anchor block supports a same operation as in the second communication system;
the base station apparatus allocates resources such that a shared data channel for transmission of user data and downlink control information for demodulation of the shared data channel are mapped to the same or different fundamental frequency blocks;
the base station apparatus controls whether or not to add a carrier indicator of a fundamental frequency block to which the shared data channel is mapped to the downlink control information; and
the base station apparatus, in an anchor block, regardless of whether or not the carrier indicator exists, maps downlink control information, which is for demodulating the shared data channel mapped to the anchor block and to which the carrier indicator is not added, in a control channel region of the anchor block.

2. The radio communication system as defined in claim 1, wherein, in the first communication system, when the carrier indicator is added to the downlink control information to be mapped in a control channel region of each fundamental frequency block assigned to the user terminal, downlink control information in which the carrier indicator is added and the downlink control information in which the carrier indicator is not added are mapped to the anchor block.

3. A base station apparatus in a radio communication system in which a first communication system and a second communication system are arranged in an overlapping manner, the first communication system adding or removing a frequency band to assign for communication between the base station apparatus and a user terminal on a per fundamental frequency block basis, and the second communication system performing communication between the base station apparatus and the user terminal via one fixed fundamental frequency block, the base station apparatus comprising:
- a section that allocates resources such that a shared data channel for transmission of user data and downlink control information for demodulation of the shared data channel are mapped to the same or different fundamental frequency blocks;
- a section that controls whether or not to add a carrier indicator of a fundamental frequency block to which the shared data channel is mapped to the downlink control information; and
- a section that, in an anchor block, regardless of whether or not the carrier indicator exists, maps downlink control information, which is for demodulating the shared data channel mapped to the anchor block and to which the carrier indicator is not added, in a control channel region of the anchor block,
- wherein, in the first communication system, one of fundamental frequency blocks assigned to the user terminal is determined as the anchor block, and the anchor block supports a same operation as in the second communication system.

4. A user terminal in a radio communication system in which a first communication system and a second communication system are arranged in an overlapping manner, the first communication system adding or removing a frequency band to assign for communication between a base station apparatus and the user terminal on a per fundamental frequency block basis, and the second communication system performing communication between the base station apparatus and the user terminal via one fixed fundamental frequency block, the user terminal comprising:
- a receiving section that receives fundamental frequency blocks including an anchor block; and
- a section that demaps downlink control information of the anchor block,
- wherein one of the fundamental frequency blocks assigned by the base station apparatus is determined as the anchor block that supports a same operation as in the second communication system, and, in this anchor block, downlink reception processing is performed in accordance with the second communication system,
- in the first communication system, resources are allocated such that a shared data channel for transmission of user data and downlink control information for demodulation of the shared data channel are mapped to the same or different fundamental frequency blocks, and whether or not to add a carrier indicator of a fundamental frequency block to which the shared data channel is mapped to the downlink control information is controlled, and
- in the anchor block, downlink control information, which is for demodulating the shared data channel mapped to the anchor block and to which the carrier indicator is not added, is mapped in a control channel region of the anchor block.

5. A radio communication system in which a first communication system and a second communication system are arranged in an overlapping manner, the radio communication system comprising:
- a base station apparatus communicating in the first and second communication systems; and
- a user terminal communicating with the base station,
- the first communication system adding or removing a frequency band to assign for communication between the base station apparatus and the user terminal on a per fundamental frequency block basis, and the second communication system performing communication between the base station apparatus and the user terminal via one fixed fundamental frequency block, wherein:
- in the first and second communication systems, a common search space that is common between user terminals and a user specific search space that is separate between user terminals are assigned to a downlink control channel region of the fundamental frequency block; and
- the base station apparatus:
  - maps user common control information, which a plurality of user terminals connecting to a same cell, need to receive, to the common search space;
  - maps user-specific control information, which each user terminal needs to receive individually, to the user-specific search space, in a configuration according to the first communication system; and
  - furthermore, maps the user-specific control information, which each user terminal needs to receive individually, to the common search space, fixedly to the configuration which guarantees the same operation as in the second communication system.

6. The radio communication system as defined in claim 5, wherein, as a user-specific control information configuration for the first communication system, the base station apparatus includes a carrier indicator of a fundamental frequency block, to which a shared data channel to be demodulated using the user-specific control information is mapped.

* * * * *